US011960009B2

(12) United States Patent
Chen et al.

(10) Patent No.: US 11,960,009 B2
(45) Date of Patent: Apr. 16, 2024

(54) OBJECT CONTOUR DETERMINATION

(71) Applicant: Zoox, Inc., Foster City, CA (US)

(72) Inventors: Yuanyuan Chen, San Mateo, CA (US);
Zeng Wang, Menlo Park, CA (US)

(73) Assignee: ZOOX, INC., Foster City, CA (US)

( * ) Notice: Subject to any disclaimer, the term of this patent is extended or adjusted under 35 U.S.C. 154(b) by 514 days.

(21) Appl. No.: 17/138,751

(22) Filed: Dec. 30, 2020

(65) Prior Publication Data
US 2022/0206162 A1 Jun. 30, 2022

(51) Int. Cl.
G01S 17/931 (2020.01)
B60W 30/09 (2012.01)
B60W 30/095 (2012.01)
G01C 21/00 (2006.01)
(Continued)

(52) U.S. Cl.
CPC ............ G01S 17/931 (2020.01); B60W 30/09 (2013.01); B60W 30/0956 (2013.01); G01C 21/3837 (2020.08); G01S 17/89 (2013.01); G08G 1/166 (2013.01); B60W 2420/408 (2024.01); B60W 2554/20 (2020.02); B60W 2554/4029 (2020.02)

(58) Field of Classification Search
CPC ............. B60W 30/09; B60W 30/0956; B60W 2420/52; B60W 2554/20; B60W 2554/4029; G01S 7/4802; G01S 17/89; G01S 17/931; G01C 21/3837; G01C 21/3602; G08G 1/166; G06V 10/44; G06V 20/58
See application file for complete search history.

(56) References Cited

U.S. PATENT DOCUMENTS 10,430,641 B2   10/2019  Gao
10,520,904 B2*  12/2019  Mercep ................. G01S 13/867
2010/0191391 A1  7/2010  Zeng
(Continued)

FOREIGN PATENT DOCUMENTS

CN      110097786 B     8/2019
GB        2570887 A     8/2019
WO    WO2020133118 A1   7/2020

OTHER PUBLICATIONS

Duckham, Matt, et al. "Efficient generation of simple polygons for characterizing the shape of a set of points in the plane." Pattern recognition 41.10 (2008): 3224-3236. (Year: 2008).*
(Continued)

Primary Examiner — Luke D Ratcliffe
(74) Attorney, Agent, or Firm — Lee & Hayes P.C.

(57) ABSTRACT

Techniques for determining an object contour are discussed. Depth data associated with an object may be received. The depth data, such as lidar data, can be projected onto a two-dimensional plane. A first convex hull may be determined based on the projected lidar data. The first convex hull may include a plurality of boundary edges. A longest boundary edge, having a first endpoint and a second endpoint, can be determined. An angle can be determined based on the first endpoint, the second endpoint, and an interior point in the interior of the first convex hull. The longest boundary edge may be replaced with a first segment based on the first endpoint and the interior point, and a second segment based on the interior point and the second endpoint. An updated convex hull can be determined based on the first segment and the second segment.

20 Claims, 12 Drawing Sheets

(51) Int. Cl.
    *G01S 17/89*     (2020.01)
    *G08G 1/16*     (2006.01)

(56) References Cited

U.S. PATENT DOCUMENTS

| | | | |
|---|---|---|---|
| 2015/0062117 A1* | 3/2015 | Reitmayr | G06T 15/00 |
| | | | 345/419 |
| 2017/0220874 A1* | 8/2017 | Ayvaci | G06F 18/22 |
| 2018/0322650 A1 | 11/2018 | Becker et al. | |
| 2019/0243371 A1 | 8/2019 | Nister et al. | |
| 2020/0082180 A1* | 3/2020 | Wang | G06V 20/56 |
| 2020/0124725 A1* | 4/2020 | Qiu | G01S 17/93 |
| 2020/0218979 A1 | 7/2020 | Kwon et al. | |
| 2020/0401147 A1 | 12/2020 | Lim et al. | |
| 2021/0027075 A1 | 1/2021 | Lee et al. | |
| 2022/0161767 A1 | 5/2022 | Svensson | |
| 2022/0204029 A1 | 6/2022 | Chen et al. | |
| 2022/0261601 A1 | 8/2022 | Amato et al. | |

OTHER PUBLICATIONS

Office Action for U.S. Appl. No. 17/138,710, dated Sep. 15, 2022, Chen, "Collision Avoidance Using an Object Contour", 17 pages.
International Search Report and Written Opinion for PCT Application No. PCT/US21/62125, dated Mar. 24, 2022, 9 pgs.
Office Action for U.S. Appl. No. 17/138,710, dated Sep. 14, 2023, Chen, "Collision Avoidance Using an Object Contour", 14 pages.
Office Action for U.S. Appl. No. 17/138,710, dated Apr. 13, 2023, Chen, "Collision Avoidance Using an Object Contour" 19 pages.

\* cited by examiner

OBJECT CONTOUR DETERMINATION

BACKGROUND

Vehicles often encounter objects when navigating through an environment. These objects may include other vehicles, pedestrians, animals, and the like. When attempting to safely navigate past a particular object, a vehicle may determine a location, size, and shape of the object. In some situations, the vehicle may determine a size and shape of the object based on a bounding box. However, bounding boxes may fail to provide accurate representations of an object. This failure may compromise the safe navigation of the vehicle past the object.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
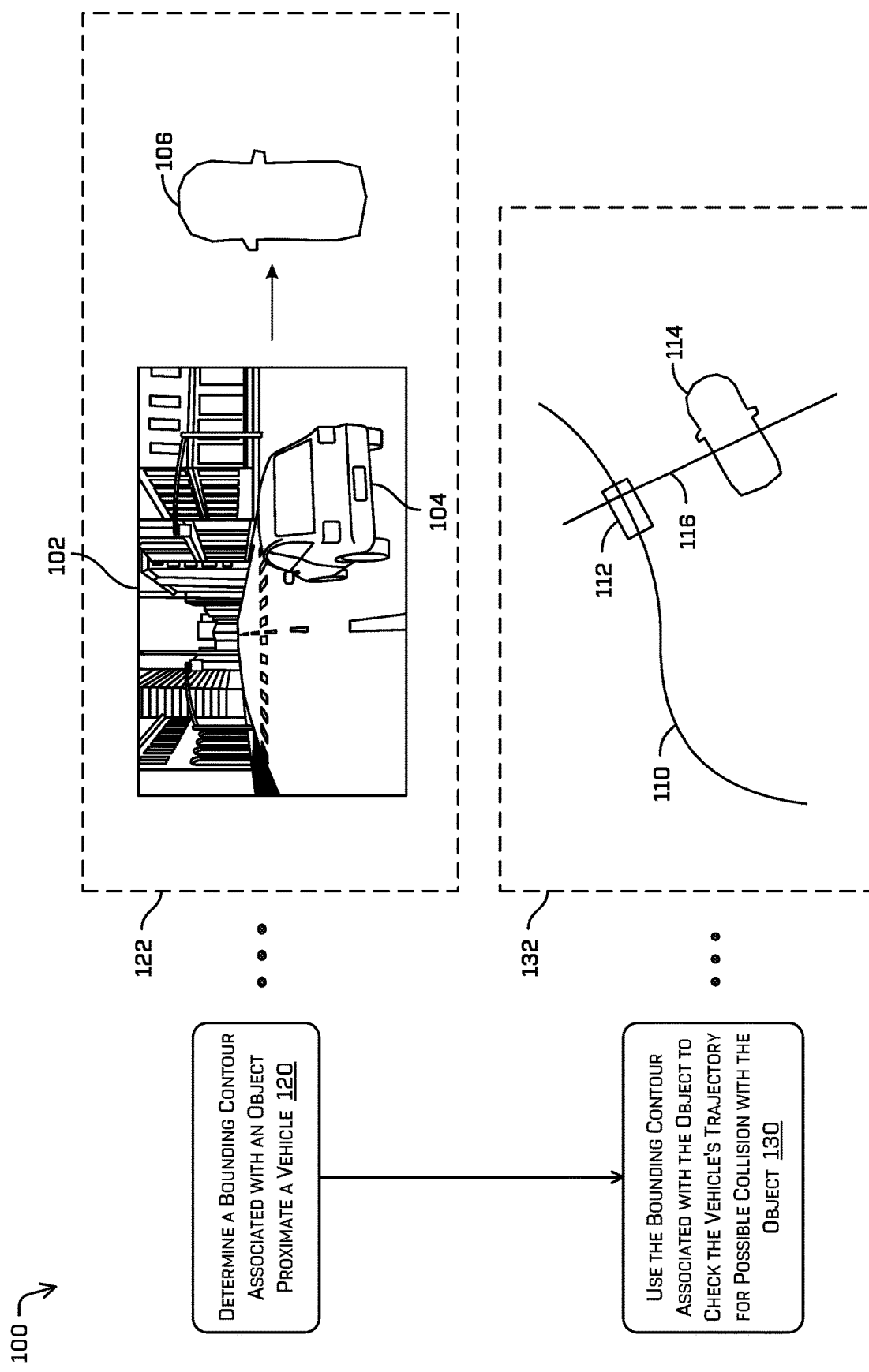
FIG. 1 is an illustration of an example implementation to determine a bounding contour associated with an object and use the bounding contour to check a vehicle's trajectory for possible collision with the object, in accordance with examples of the disclosure.

This disclosure is directed to techniques for determining bounding contours associated with objects and using those bounding contours for actions such as collision avoidance. In some examples, a lidar sensor may receive lidar data associated with an object. The lidar data may be projected into a two-dimensional plane and a convex hull can be identified based on the projected lidar data. The boundary edges associated with the convex hull can be removed to determine a bounding contour that represents a tight-fitting perimeter of an object. The bounding contour can be used, for example, in a planning component of a vehicle to determine whether the vehicle is likely to collide with the object represented by the bounding contour.

In some examples, when replacing a longest boundary edge of the convex hull, the longest boundary edge can have a first endpoint and a second endpoint. An interior point within the convex hull may be identified. In some examples, the longest boundary edge may be replaced with 1) a first segment based on the first endpoint and the interior point, and 2) a second segment based on the interior point and the second endpoint. An updated convex hull can be determined based on the first segment and the second segment. The process of serially replacing the longest boundary edges can generate a bounding contour that closely represents the perimeter of the associated object.

In some examples, sensor data can include lidar data can include multiple lidar points. In connection with projecting the lidar data to a two-dimensional representation, some of all of the lidar points can be repositioned to a closest location on a predefined grid. If any two or more lidar points share the same grid location, some or all of the duplicate lidar points can be deleted such that one lidar point remains for each grid location. In some examples, the predefined grid locations may have a spacing of one centimeter, although other dimensions are contemplated herein.

In some examples, a system may determine whether a vehicle is likely to collide with an object based on a bounding contour associated with the object. If a likely collision is detected, the system may determine a vehicle action to avoid collision with the object and initiate that action in an attempt to avoid the collision. In other examples, an action may be determined based on the bounding contour associated with the object. For example, the action may include at least one of controlling a vehicle, determining a static object, determining a dynamic object, or updating map data.

In some examples, a bounding box may be identified that is associated with an object identified in lidar point cloud data. The size of the bounding box is expanded to include a greater amount of the lidar point cloud data. Lidar points within the expanded bounding box can be captured to provide increased lidar data associated with the object. A bounding shape associated with all of the lidar points in the expanded bounding box may be created to better represent the contour of the object.

In some examples, a system may receive a trajectory associated with a vehicle and receive sensor data from a sensor associated with the vehicle. A bounding contour may be determined, where the bounding contour is associated with an object represented in the sensor data. Based on the trajectory associated with the vehicle, the system may determine a simulated position of the vehicle. Additionally, a predicted position of the bounding contour may be determined. Based on the simulated position of the vehicle and the predicted position of the bounding contour, a distance between the vehicle and the object may be determined. An action can be performed based on the distance between the vehicle and the object.

In some examples, the bounding contour discussed herein may be a polygon that closely identifies the perimeter of the object. The action to be performed based on the distance between the vehicle and the object may include validating the trajectory or invalidating the trajectory. In some examples, the distance between the vehicle and the object may be determined using ray casting. For example, the ray traces may extend (e.g., perpendicularly) from the side of a vehicle (or from a point associated with a trajectory) toward a bounding contour. A collision can be detected based on a number of bounding contour edges the ray passes through. For example, if the ray passes through an even number of bounding contour edges, there is no collision. But, if the ray passes through an odd number of bounding contour edges, a collision will occur between the vehicle and the object.

In some examples, an axis-aligned bounding box can be used to quickly check for potential collisions, such as between a vehicle and an object. For example, the axis-aligned bounding box may be associated with a bounding contour. A second distance between a vehicle and the object may be determined based on the axis-aligned bounding box. In some examples, the axis-aligned bounding box is aligned with the longitudinal axis of the vehicle.

The techniques discussed herein can improve the functioning of a computing device of a vehicle in a number of ways. The described techniques provide an improved representation of a shape of an object. As described herein, a bounding contour provides a polygon that closely follows a perimeter of an object. The bounding contour is not limited to four sides like a bounding box. Thus, the bounding contour can adjust to all of the object's shapes to provide an accurate representation of the object. The tight-fitting bounding contour supports more accurate determinations of potential collisions, distances between vehicles and objects, and other actions related to objects.

The techniques discussed herein may also provide improved functioning of a computing device of a vehicle by determining a bounding contour faster and with fewer computing resources. As compared to existing techniques, such as a Delaunay triangulation, the described systems and methods may simplify the creation of a bounding contour without the need to create multiple triangles that cover every point in a set of points. The Delaunay triangulation process, which requires the creation of multiple triangles in the set of points can be time-consuming and requires significant computing resources. The systems and methods described herein may simplify the process by eliminating the need to calculate triangles in a set of points.

The techniques described herein can be implemented in a number of ways. Example implementations are provided below with reference to the following figures. Although discussed in the context of an autonomous vehicle, the methods, apparatuses, and systems described herein can be applied to a variety of systems and are not limited to autonomous vehicles. In another example, the techniques can be utilized in any type of vehicle, robotic system, or any system using sensor data. Additionally, the techniques described herein can be used with real data (e.g., captured using sensor(s)), simulated data (e.g., generated by a simulator), or any combination of the two.

FIG. 1 depicts a pictorial flow diagram of an example process 100 related to an environment 122 and an environment 132 to determine a bounding contour associated with an object and use the bounding contour to check a vehicle's trajectory for possible collision with the object, in accordance with examples of the disclosure. In some examples, determining the bounding contour associated with an object may be performed by a vehicle computing device in a vehicle, as discussed herein. Additionally, some examples may use the vehicle computing device to check the vehicle's trajectory for possible collision with the object based on the bounding contour.

As shown in FIG. 1, process 100 includes an operation 120 that determines a bounding contour associated with an object proximate a vehicle. Process 100 further includes an operation 130 that uses the bounding contour associated with the object to check the vehicle's trajectory for possible collision with the object.

As shown in environment 122, an example image 102 depicts a scene in which an object 104 may be operating. In example image 102, the object 104 is shown as a vehicle. In other examples, object 104 may be any type of static object or dynamic object. For example, static objects may include trees, buildings, signs, traffic signals, and the like. Example dynamic objects may include vehicles, pedestrians, animals, and the like. In some examples, object 104 may be moving at particular times (e.g., a moving vehicle) and may be stopped at other times (e.g., a parked vehicle or a vehicle stopped at a traffic light).

FIG. 1 also illustrates an example bounding contour 106 associated with the object 104 in the image 102. The bounding contour 106 may be created, for example, using the systems and methods discussed herein. The bounding contour 106 may be associated with an outer perimeter of the object 104. As discussed herein, the bounding contour 106 may be used to avoid collisions with the object 104 and to maintain a safe distance from the object. In some examples, the bounding contour 106 can be used in combination with a bounding box (e.g., a rectangular box associated with the object 104), both of which may provide information associated with the object 104.

In some examples, bounding contour 106 may provide a better representation of the exact shape of an object than a bounding box. In particular examples, the bounding box may be a rectangle with four sides. This basic rectangular shape may not accurately represent the object since the bounding box may be expanded to include all portions of the object. For example, in the context of a vehicle with large side mirrors, a bounding box expanded to fit the mirrors may be significantly larger than the actual vehicle. Similarly, if the bounding box was sized to fit the body of the vehicle with large side mirrors, the bounding box may not encompass the side mirrors. In contrast, bounding contour 106 may be a polygon created to closely follow the outer edges of the object, regardless of the object's shape or irregularities. This tight-fitting polygon may provide a more accurate representation of the object's shape than a rectangular bounding box. In one or more examples, the polygon representing bounding contour 106 may have five or more outer edges, which are also referred to as "boundary edges" herein.

In some examples, the bounding contour 106 may be used when checking a vehicle's trajectory for possible collision with the object 104. As shown in environment 132, a trajectory 110 may define a planned driving path for a vehicle 112 through the environment 132. In FIG. 1, a bounding contour 114 associated with an object is displayed relative to the trajectory 110 and the vehicle 112. The bounding contour 114 may be associated with any object type, such as another vehicle, a pedestrian, an animal, a building, a street sign, a tree, and the like. As discussed herein, the described systems and methods may determine a distance between the vehicle 112 and the bounding contour 114 using ray casting as indicated by a ray 116. Based on the distance between the vehicle 112 and the bounding contour 114, the vehicle 112 may take one or more actions to avoid collision with an object associated with the bounding contour 114. For example, the vehicle 112 may take actions such as steering, braking, sounding a horn, warning vehicle occupants, and the like depending on the distance from the object and the potential risk associated with the type of object.

As discussed herein, some examples may determine a bounding contour associated with an object, check a vehicle's trajectory for possible collision with the object, and perform other activities using a vehicle computing device in a vehicle. Additional details regarding the vehicle are described herein.

Figure 2:
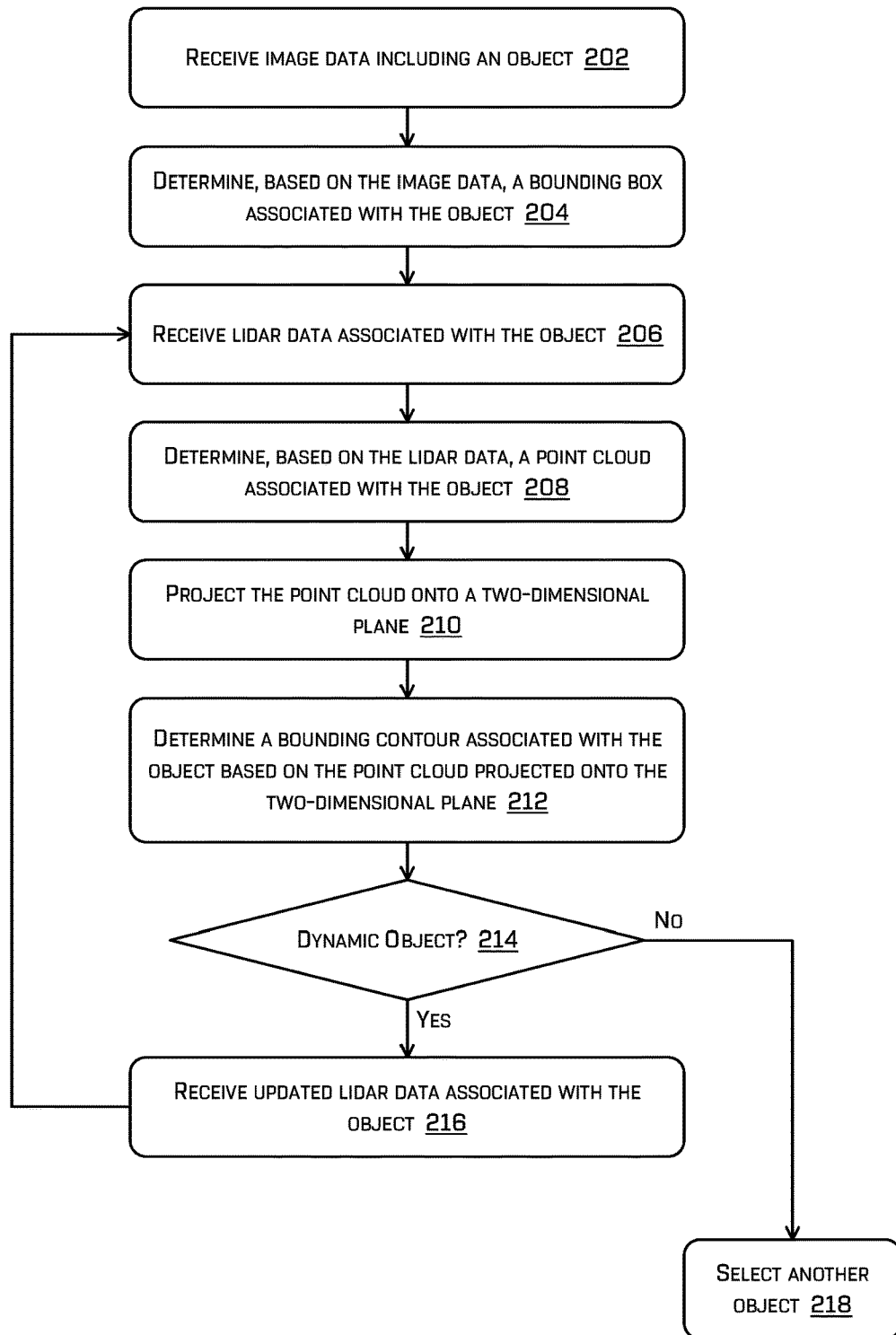
FIG. 2 is an illustration of an example process for determining a bounding contour associated with an object based on sensor data associated with the object, in accordance with examples of the disclosure.

FIG. 2 is an illustration of an example process 200 for determining a bounding contour associated with an object based on sensor data associated with the object, in accordance with examples of the disclosure. The operations described herein with respect to the process 200 may be performed by one or more vehicle computing devices, as discussed herein.

By way of example, the process 200 is illustrated as a logical flow graph, each operation of which represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the process 200. In some examples, multiple branches represent alternate implementations that may be used separately or in combination with other operations discussed herein.

At operation 202, the process may include receiving image data including an object. In some examples, the image data may be captured by an image sensor (e.g., a camera) associated with a vehicle. At operation 204, the process may include determining a bounding box associated with the object based on the image data. In some examples, a three-dimensional bounding box can be determined based on the image data. Example techniques for determining a three-dimensional bounding box are discussed in U.S. patent application Ser. No. 15/814,870 titled "Pose Determination from Contact Points" and filed Nov. 16, 2017, and U.S. patent application Ser. No. 16/408,414 titled "Image-Based Depth Data and Bounding Boxes" and filed May 9, 2019, the entirety of both of which are herein incorporated by reference, for all purposes. However, a bounding box can be determined based on other sensor data, such as lidar data, time of flight data, and the like. In some examples, the process 200 may omit operations 202 and 204.

In some examples, a bounding box may be determined based on lidar data that may be captured by a lidar sensor as discussed herein. In this example, operations 202 and 204 can be replaced with operations that determine a bounding box based on lidar data associated with an object.

At operation 206, the process may receive lidar data associated with an object. The lidar data may be received from a lidar sensor associated with a vehicle, a structure, or any other item. In some examples, the lidar data includes a point cloud that includes multiple lidar points identified by the lidar sensor. At operation 208, the process may determine a point cloud associated with the object. The point cloud associated with the object may represent a sub-region (e.g., a region of interest) of the overall point cloud specifically associated with the object. In some examples, a subset of lidar points may be determined based on instance segmentation identifying an object.

At operation 210, the point cloud associated with the object may be projected onto a two-dimensional plane, such as a substantially horizontal plane. At operation 212, the process may determine a bounding contour associated with the object based on the point cloud projected onto the two-dimensional plane. In some examples, the bounding contour may be provided to a vehicle planning component (e.g., planning component 1232 shown in FIG. 12) for use in comparing the boundary contour to a planned vehicle trajectory, as discussed herein.

In one or more examples, the bounding contour may be extended to a three-dimensional representation. For example, the two-dimensional boundary contour may be defined in an x-y plane. The two-dimensional boundary contour can be extended to a three-dimensional representation by extending the boundary contour along an x axis that is perpendicular to the x-y plane. In some examples, the two-dimensional boundary contour may be extended to a three-dimensional representation using a convolutional neural network (CNN).

At operation 214, the process may determine whether the object is a dynamic object, such as a moving vehicle, a pedestrian, an animal, and the like. If the object is not a dynamic object, the process may continue to operation 218 to select another object. In this situation where the object is static (e.g., not dynamic), the bounding contour may not change at regular intervals, so the bounding contour determined at operation 212 may not require updating.

If the object is dynamic, the process may continue from operation 214 to operation 216, where the process may receive updated lidar data associated with the object. In some examples, if the object is dynamic, its bounding contour may change as the object moves. In this situation, it may be advantageous to update the lidar data to determine an updated bounding contour. For example, a shape of an articulated bus may change over time as the articulated bus navigates corners in an environment. In some examples, a shape of a convex hull can be predicted based on a predicted trajectory associated with the objects. After receiving the updated lidar data at operation 216 (or predictions about the object), the process may return to operation 206 to determine updated lidar data associated with the object.

Figure 3:
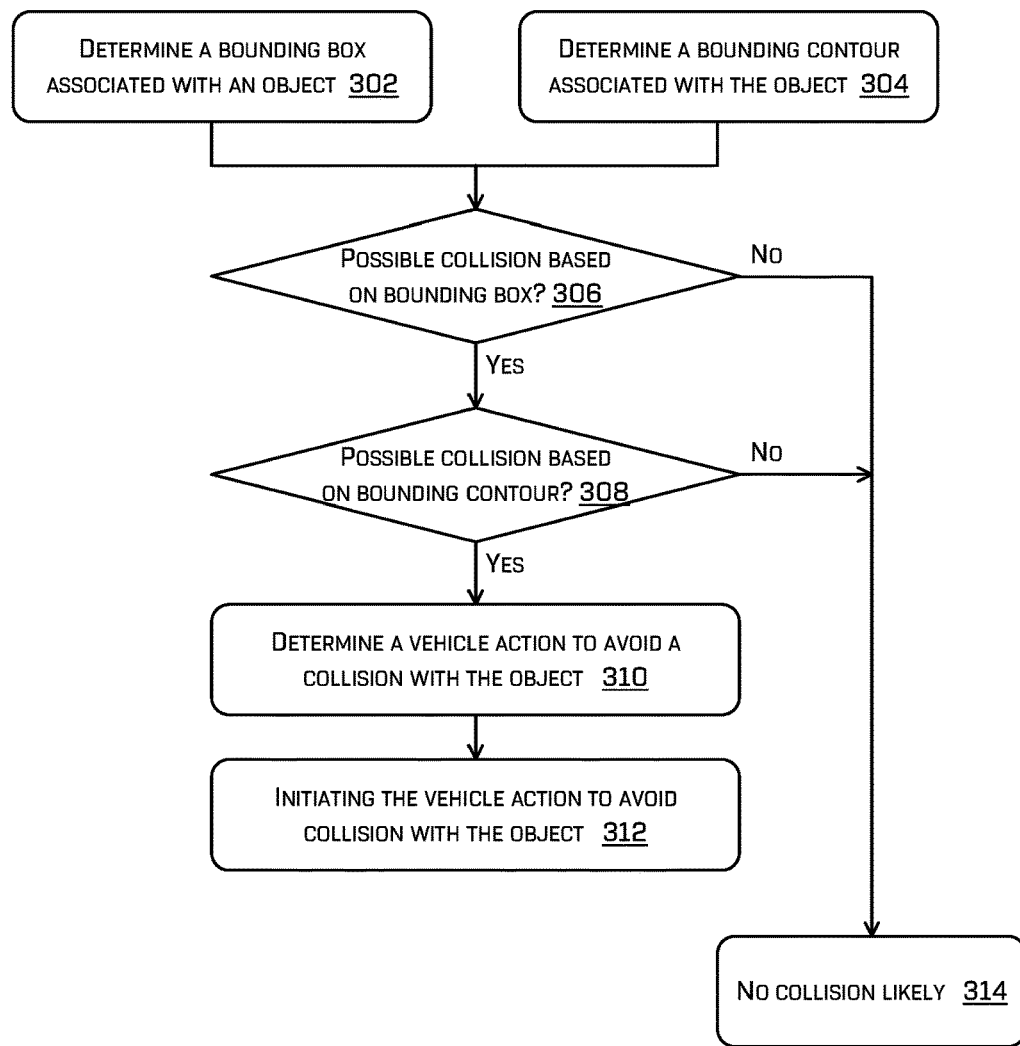
FIG. 3 is an illustration of an example process for using a bounding box and a bounding contour to check for a possible collision with an object, in accordance with examples of the disclosure.

FIG. 3 is an illustration of an example process 300 for using a bounding box and a bounding contour to check for a possible collision with an object, in accordance with examples of the disclosure. The operations described herein with respect to the process 300 may be performed by one or more vehicle computing devices, as discussed herein.

By way of example, the process 300 is illustrated as a logical flow graph, each operation of which represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the process 300. In some examples, multiple branches represent alternate implementations that may be used separately or in combination with other operations discussed herein.

At operation 302, the process may include determining a bounding box associated with an object. In some examples, the bounding box may be determined based on an image of the object, lidar data associated with the object, and the like. In some examples, the bounding box determined in the operation 302 can be an axis-aligned bounding box based on the bounding contour determined in the operation 304. Additional examples of an axis-aligned bounding box are discussed in FIGS. 11A-11C, as well as throughout this disclosure.

At operation 304, the process may determine a bounding contour associated with the object. For example, the systems and methods discussed herein may be used to determine a bounding contour associated with the object. Additional examples of determining a bounding contour are discussed in FIGS. 6, 7, 8A, and 8B, as well as throughout this disclosure.

At operation 306, the process may determine whether there is a possibility of a collision with the object based on the bounding box. In some examples, operation 306 may determine a likelihood of a collision between the object and a vehicle performing the process 300. If operation 306 determines there is no possibility of a collision (or the possibility is below a threshold value) based on the bounding box, the process ends at operation 314, which indicates a "no collision likely" status. In some examples, the "no collision likely" status may be communicated to one or more systems in the vehicle, other vehicles, other systems, the object, and the like.

If operation 306 determines that there is a possibility of a collision (e.g., the possibility is above a threshold value) based on the bounding box, the process continues to operation 308. At operation 308, the process may determine whether there is a possibility of a collision with the object based on the bounding contour. In some examples, operation 308 may determine a likelihood of a collision between the object and a vehicle performing the process 300. If operation 308 determines there is no possibility of a collision (or the possibility is below a threshold value) based on the bounding contour, the process ends at operation 314, which indicates a "no collision likely" status.

If operation 308 determines that there is a possibility of a collision (e.g., the possibility is above a threshold value) based on the bounding contour, the process continues to operation 310.

In some examples, the bounding box discussed in operations 302 and 306 may have a box/cube shape or other relatively simple geometric shape. If a potential collision is detected (at operation 306), a more accurate representation of the object (e.g., a bounding contour) may be used to verify or disprove the potential collision detected at operation 306. This approach may reduce usage of computing resources by first checking for collision with the bounding box, which is a simple computation. The more complex computation associated with the bounding contour may not be performed unless a collision is detected with the bounding box or if the bounding box is predicted to be within a threshold distance of a trajectory (and/or a simulated position of the vehicle along the trajectory).

At operation 310, the process may determine a vehicle action to avoid a collision with the object. For example, the vehicle action may include steering, braking, sounding a horn, warning vehicle occupants, and the like. As discussed herein, the vehicle action determined at operation 310 may vary depending on the distance from the object and the potential risk associated with the type of object. At operation 312, the vehicle action determined at operation 310 is initiated to avoid a collision with the object.

Figure 4A:
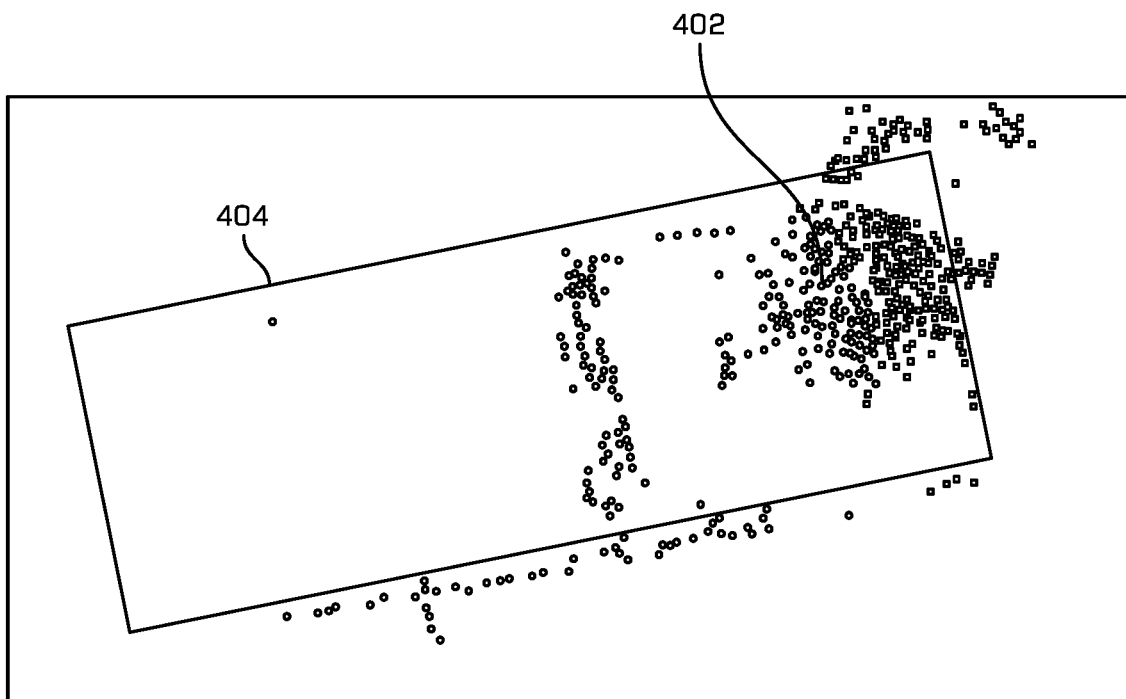
FIGS. 4A and 4B illustrate an example lidar point cloud associated with an object and a bounding shape defining the lidar point cloud, in accordance with examples of the disclosure.
Figure 4B:
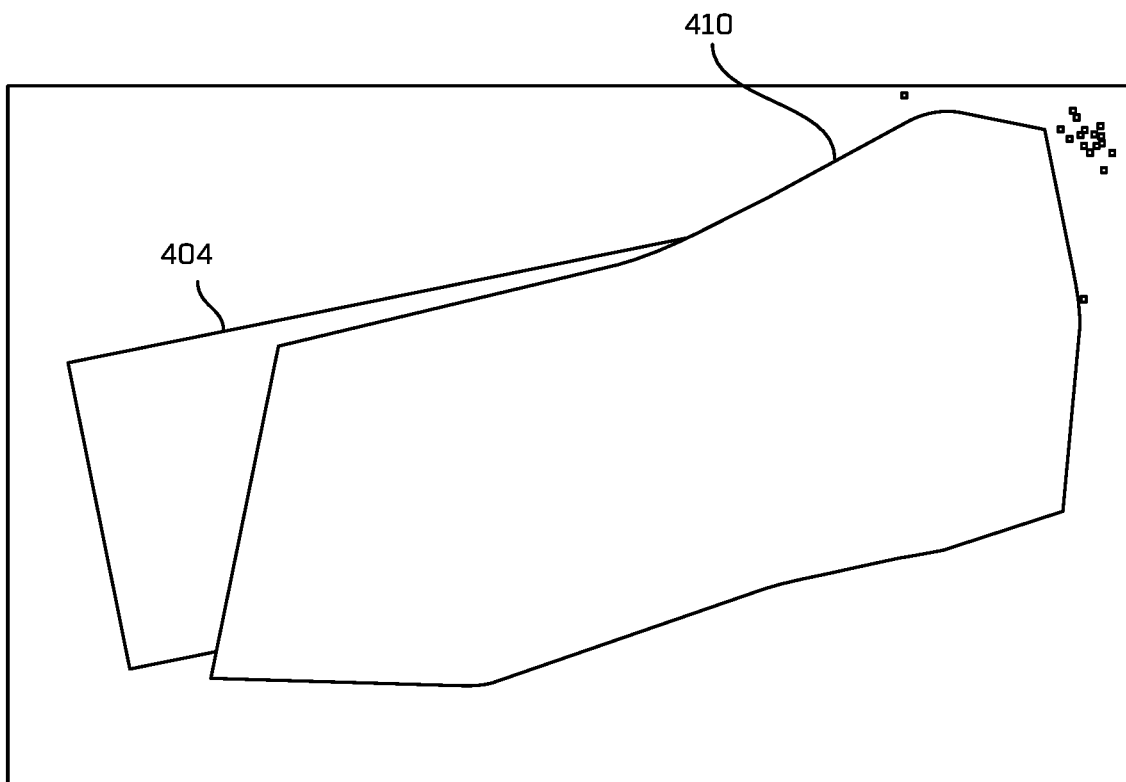

FIGS. 4A and 4B illustrate an example lidar point cloud 402 associated with an object and a bounding shape 410 defining the lidar point cloud, in accordance with examples of the disclosure. In some examples, the lidar point cloud 402 shown in FIG. 4A may be captured by a lidar sensor associated with a vehicle. As discussed herein, the lidar point cloud 402 may be used to create a bounding contour associated with an object. FIG. 4A illustrates a bounding box 404 that may be associated with some or all of the points in the lidar point cloud 402. In some examples, the bounding box 404 may represent the general shape of a vehicle but may not include portions of the vehicle that extend beyond the general shape (e.g., mirrors and other items that extend outwardly from the body of the vehicle).

FIG. 4B illustrates a bounding shape 410 that may be generated based on the lidar point cloud 402 shown in FIG. 4A. As shown in FIG. 4B, portions of the bounding shape 410 extend outside the bounding box 404 illustrated in FIG. 4A. Thus, the bounding shape 410 associated with the lidar point cloud may be a better representation of the vehicle's actual shape than the bounding box 404. When determining whether a vehicle will collide with an object, an accurate shape of the object may be important to identifying the likelihood of a collision. The systems and methods described herein discuss creation of bounding contours that define a perimeter of an object. In some examples, each bounding contour may be a polygon that closely identifies the perimeter of the object.

In some examples, the size of the bounding box 404 may be expanded to improve the likelihood of capturing all lidar points associated with the object. As shown in FIG. 4A, portions of the lidar point cloud 402 extend outside of the bounding box 404. By expanding the size of the bounding box 404, some or all of the lidar points located outside of the bounding box 404 may be captured in the bounding shape 410. Thus, rather than limiting the object information to lidar points contained inside the bounding box 404, the bounding shape 410 associated with the object may provide a better representation of the object by including the lidar points located outside the bounding box 404.

In some examples, a bounding box can be expanded by a threshold amount, which may be based on a size of the object, an object type, and the like. In some examples, the bounding box 404 may be expanded in size by 0.4 meters. In some implementations, this expansion allows the bounding shape 410 to include portions of the object that protrude beyond the bounding box 404, such as vehicle side mirrors, pedestrian arms, and the like. In other examples, the bounding box 404 may be expanded in size by any amount based on the types of objects encountered, safety requirements, desired safety margins, and the like. In one or more examples, the bounding box 404 is expanded on all four sides to capture lidar points located outside any of the sides of the bounding box 404.

Figure 5:
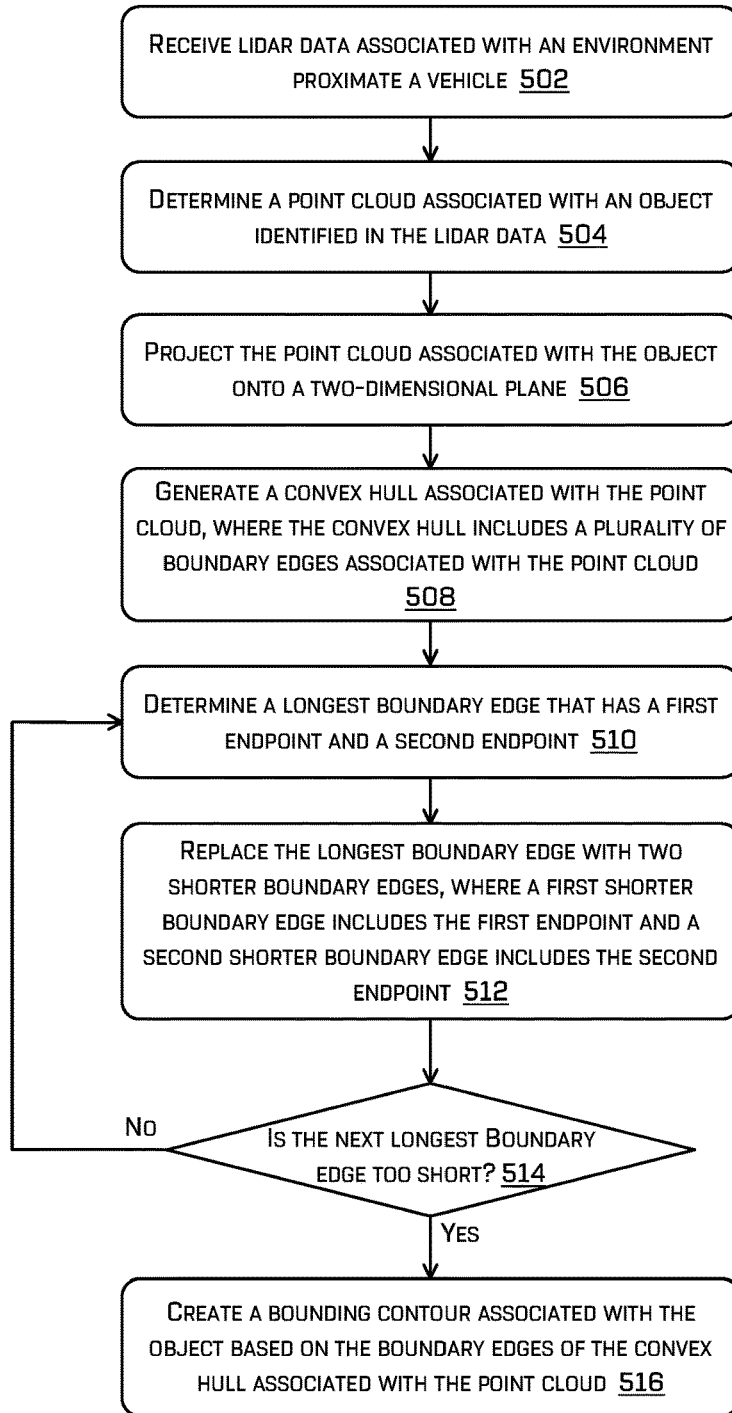
FIG. 5 is an illustration of an example process for generating a convex hull associated with a lidar point cloud and creating a bounding contour based on the convex hull, in accordance with examples of the disclosure.

FIG. 5 is an illustration of an example process 500 for generating a convex hull associated with a lidar point cloud and creating a bounding contour based on the convex hull, in accordance with examples of the disclosure. The operations described herein with respect to the process 500 may be performed by one or more vehicle computing devices, as discussed herein.

By way of example, the process 500 is illustrated as a logical flow graph, each operation of which represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the process 500. In some examples, multiple branches represent alternate implementations that may be used separately or in combination with other operations discussed herein.

At operation 502, the process may include receiving lidar data associated with an environment proximate a vehicle. In some examples, the lidar data may include one or more objects that may be important to a vehicle navigation or collision avoidance system.

At operation 504, the process may determine a point cloud associated with an object identified in the lidar data. For example, the object may be in the planned path of the vehicle or close to the planned path of the vehicle. In some examples, the point cloud associated with the object may be a portion of the lidar data received at operation 502.

At operation 506, the process may project the point cloud associated with the object onto a two-dimensional plane. At operation 508, the process may generate a convex hull associated with the point cloud. In some examples, the convex hull may include a plurality of boundary edges associated with the point cloud. In one or more examples, the convex hull may be generated using a known algorithm for computing the convex hull for a finite set of points. In some examples, the convex hull may have five or more boundary edges.

In some examples, the points associated with a point cloud or other grouping of points may be repositioned to a closest location on a predefined grid. For example, a predefined grid may have a uniform spacing, such as one centimeter between grid points. This each point in a point cloud can be repositioned to a closest grid point. In some examples, two or more points may be located at the same grid point. In this situation, all duplicate points at the same grid point may be removed, thereby leaving one point at the grid point.

In some examples, aligning the points in a point cloud to a predefined grid may simplify the creation of a bounding contour associated with the point cloud because there may be fewer points represented in the grid. This simplification may reduce the time and computing resources needed to generate a bounding contour from a point cloud.

At operation 510, the process may determine a longest boundary edge associated with the convex hull. The longest boundary edge can have a first endpoint and a second endpoint.

At operation 512, the process may replace the longest boundary edge with two shorter boundary edges. In some examples, a first shorter boundary edge may include the first endpoint and a second shorter boundary edge may include the second endpoint. In some implementations, replacing the longest boundary edge may include determining an interior point (e.g., an interior lidar point) in an interior of the convex hull. The first shorter boundary edge may be based on the first endpoint and the interior point. The second shorter boundary edge may be based on the interior point and the second endpoint. In some examples, the operation 512 can be based at least in part on an angle formed by the two shorter boundary edges. Additional examples of the operation 512 are provided in connection with FIGS. 6 and 7, as well as throughout this disclosure.

At operation 514, the process may determine whether the next longest boundary edge is too short to remove. In some examples, the next longest boundary edge may be too short to remove if the length of the next longest boundary edge is less than half the length of the first boundary edge replaced at operation 512. In alternate examples, other parameters may be used to determine when the next longest boundary edge is too short to remove. For example, other parameters may include a number of boundary edges of the convex hull meeting or exceeding a first threshold, a length of a longest remaining boundary edge being less than a second threshold, or a number of interior points associated with the updated convex hull being less than a third threshold.

If the next longest boundary edge is not too short to remove, the process returns to operation 512 to replace the next longest boundary edge.

If the next longest boundary edge is too short to remove, the process continues to operation 516, where the process may create a bounding contour associated with the object. In some examples, the bounding contour is based on the boundary edges of the convex hull associated with the point cloud. In some examples, the bounding contour associated with the object can be used to determine the possibility of a collision between a vehicle and the object.

In some examples, each point is a vector of one or more triangles. After creating multiple triangles that cover all points in the set of points, various edges may be removed to define an outer boundary associated with the set of points. However, this technique can be time consuming since it requires generation and processing of triangles that cover every point in the set of points in an attempt to define an outer boundary. The systems and methods discussed herein may provide a faster technique that uses fewer computing resources to generate a bounding contour.

Figure 6:
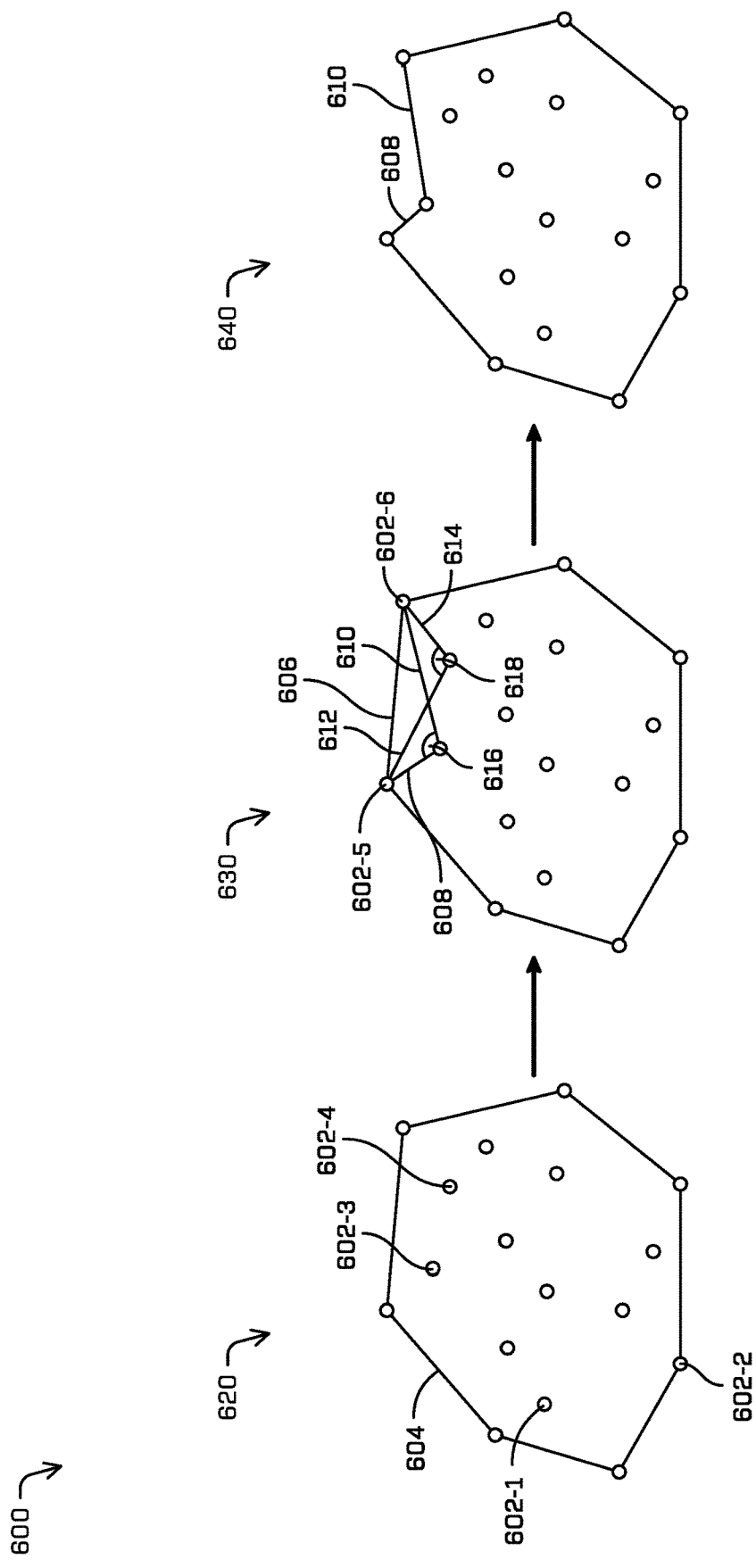
FIG. 6 is an illustration of an example process for replacing a boundary edge of a convex hull with two shorter segments, in accordance with examples of the disclosure.

FIG. 6 is an illustration of an example process 600 for replacing a boundary edge of a convex hull with two shorter segments, in accordance with examples of the disclosure. As shown in FIG. 6, a polygon 620 may include any number of boundary edges and any number of points (e.g., lidar points) contained within the boundary edges. In the example of FIG. 6, the polygon 620 includes multiple points. Some of these points are labeled as 602-1, 602-2, 602-3, and 602-4. In some examples, the points 602 may be located inside the polygon (e.g., points 602-1, 602-3, and 602-4) or on the boundary of the polygon (e.g., point 602-2). An example boundary edge 604 of the polygon 620 is illustrated in FIG. 6.

In some embodiments, all points associated with a polygon can be on the boundary of the polygon or inside the polygon. As discussed herein, one or more boundary edges of the polygon may be replaced to create a tighter bounding contour. In one or more examples, the resulting polygon (after replacing a boundary edge) can maintain a simple polygon shape. For example, the resulting polygon may not have any loops, holes, or self-intersecting edges. The examples described herein illustrate the removal of boundary edges in a manner that maintains a simple polygon shape.

As shown in FIG. 6, a polygon 630 is similar to the polygon 320 discussed above. Based on the polygon 630, the systems and methods described herein select a longest boundary edge to replace with two shorter boundary edges. In one example, the longest boundary edge may be boundary edge 606 having a first endpoint 602-5 and a second endpoint 602-6. The endpoints 602-5 and 602-6 are points associated with the boundary of the polygon 630.

In some examples, multiple pairs of shorter boundary edges may be identified as possible candidates to replace the longest boundary edge 606. As shown in the polygon 630, a first pair of shorter boundary edges are shown as boundary edges 608 and 610. For example, the first shorter boundary edge 608 extends from point 602-5 (one of the endpoints of the longest boundary edge 606) to point 602-3 (shown in the polygon 620). In this example, point 602-3 is an interior point inside the polygon. As shown in the polygon 630, the second shorter boundary edge 610 extends from point 602-6 (another endpoint of the longest boundary edge 606) to point 602-3 (shown in the polygon 620). Thus, the first pair of shorter boundary edges 608, 610 replace the longest boundary edge 606 by connecting with point 602-3.

In the example of FIG. 6, a second pair of shorter boundary edges are shown as boundary edges 612 and 614. For example, the first shorter boundary edge 612 extends from point 602-5 (one of the endpoints of the longest boundary edge 606) to point 602-4 (shown in the polygon 620). In this example, point 602-4 is an interior point inside the polygon. As shown in the polygon 630, the second shorter boundary edge 614 extends from point 602-6 (another endpoint of the longest boundary edge 606) to point 602-4 (shown in the polygon 620). In this situation, the second pair of shorter boundary edges 612, 614 replace the longest boundary edge 606 by connecting with point 602-4.

Thus, the two candidates to replace the longest boundary edge 606 are the first pair 608, 610 and the second pair 612, 614. In some examples, to select a particular candidate, the described systems and methods may identify the angle between the two shorter boundary edges associated with each pair. In one or more examples, the selected pair of shorter boundary edges is the pair having the largest angle between the two shorter boundary edges. In the example of FIG. 6, the first pair of shorter boundary edges 608, 610 have an angle of 616. As shown in FIG. 6, the second pair of shorter boundary edges 612, 614 have an angle of 618. In this example, angle 616 is larger than angle 618. Therefore, the first pair of shorter boundary edges 608, 610 are selected to replace the longest boundary edge 606.

As shown in FIG. 6, a polygon 640 is similar to the polygons 620 and 630 discussed above. Referring to the polygon 640, the longest boundary edge 606 has been replaced with the two shorter boundary edges 608 and 610. As illustrated in the polygon 640, the new polygon is smaller based on the replacement of the longest boundary edge 606. Since the shorter boundary edges 608 and 610 share the point 602-3 formerly located within the polygon, the integrity of the polygon is maintained while tightening the convex hull. In some examples, the shorter boundary edges 608 and 610 replace the longest boundary edge 606 without removing any points.

In some examples, the described systems and methods repeat the process 600 discussed with respect to FIG. 6 to continue removing the longest boundary edges. As discussed above with respect to FIG. 5, the process may be repeated until the next longest boundary edge is too short.

Figure 7:
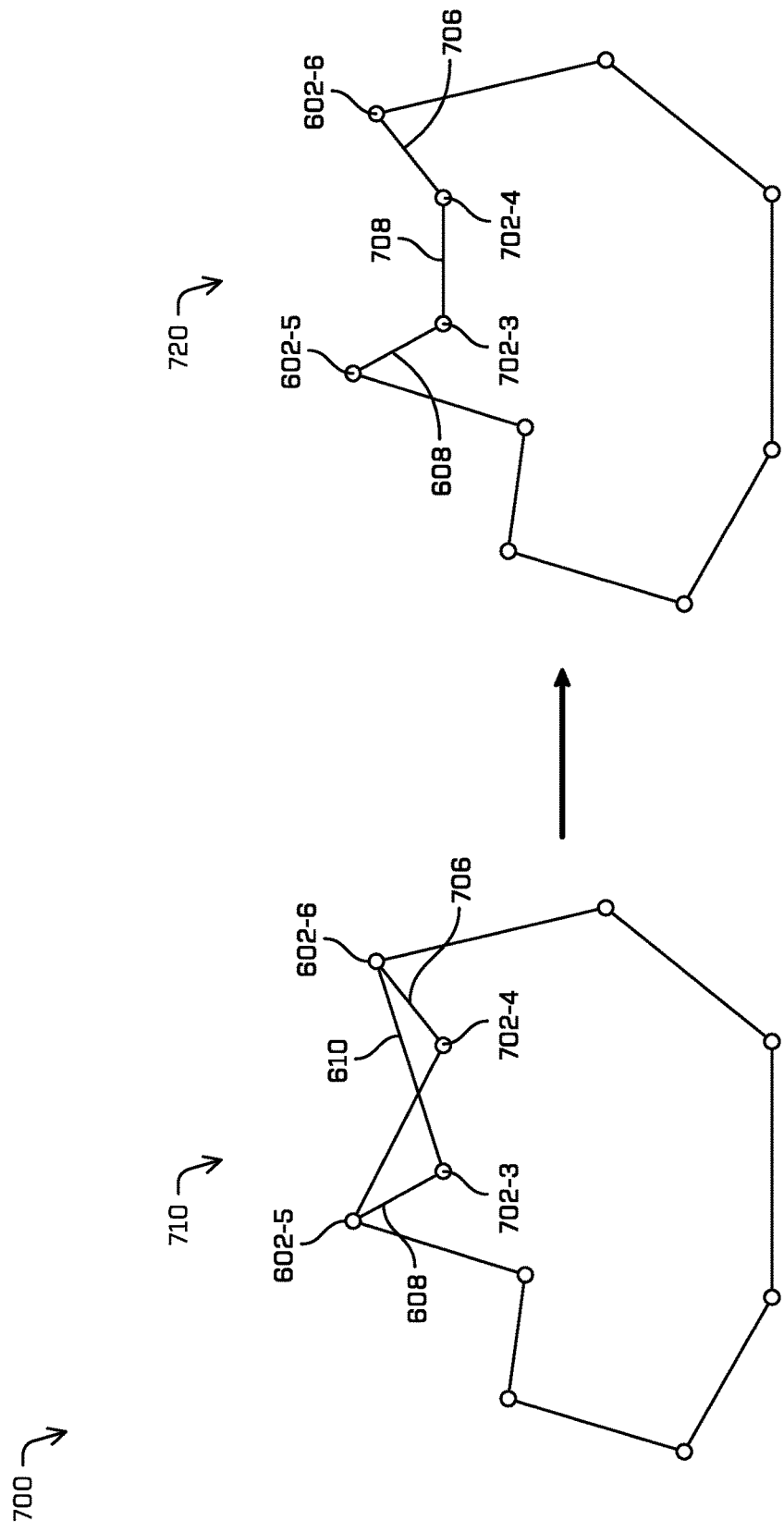
FIG. 7 is an illustration of another example process for replacing a boundary edge of a convex hull with two shorter segments, in accordance with examples of the disclosure.

FIG. 7 is an illustration of another example process 700 for replacing a boundary edge of a convex hull with two shorter segments, in accordance with examples of the disclosure. As shown in FIG. 7, a polygon 710 is similar to the polygons discussed with respect to FIG. 6. The polygon 710 illustrates the polygon with new boundary edges 608 and 610, as discussed above. In some examples, boundary edge 610 is determined to be the next longest boundary edge to replace. As shown in the polygon 710 of FIG. 7, a pairs of shorter boundary edges 704 and 706 are identified as a candidate to replace the current longest boundary edge 610. In this example, the angle associated with shorter boundary edges 704 and 706 is the same as the angle associated with other shorter boundary edge candidates. In some examples, when the two angles are the same, the described systems and methods may randomly select one of the candidates. In the example of FIG. 7, the current longest boundary edge 610 is replaced with new shorter boundary edges 706 and 708 as shown in a polygon 720. In the example polygon 720, the new shorter boundary edge 706 has endpoints of 702-3 and 702-4, and the new shorter boundary edge 708 has endpoints of 702-4 and 602-6.

Figure 8A:
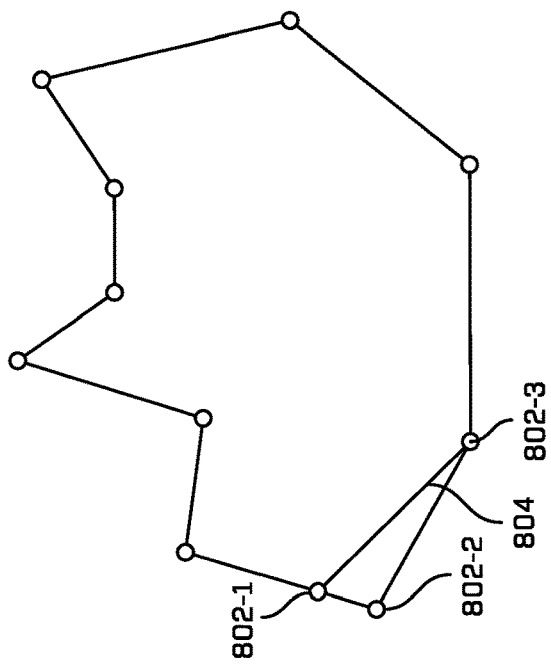
FIGS. 8A and 8B illustrate an example convex hull with a lidar point on a boundary edge and an example stray point positioned away from the majority of the lidar points, in accordance with examples of the disclosure.
Figure 8B:
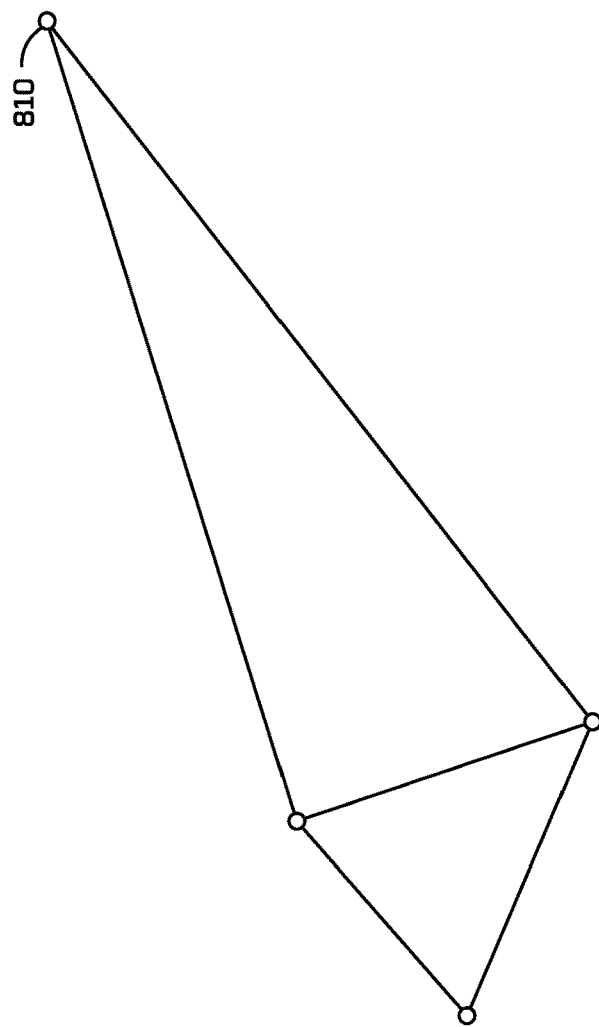

FIGS. 8A and 8B illustrate an example convex hull with a lidar point on a boundary edge and an example stray point positioned away from the majority of the lidar points, in accordance with examples of the disclosure. In the example of FIG. 8A, a convex hull is illustrated with multiple lidar points on a boundary of the convex hull. For example, points 802-1, 802-2, and 802-3 are located on the convex hull boundary. As shown in FIG. 8A, a proposed new boundary edge 804 extends from point 802-1 to 802-3. In some examples, this proposed new boundary edge 804 is not permitted because the new edge 804 would eliminate the point 802-2 from the boundary. In this situation, the point 802-2 would be outside the convex hull. In one or more examples, this type of boundary edge replacement is not permitted because all points may be required to be inside the convex hull or associated with the boundary of the convex hull.

In the example of FIG. 8B, an example stray point 810 is positioned away from the majority of the lidar points. In some examples, the point 810 is maintained as part of the convex hull polygon. In one or more examples, the point 810 is not removed from the polygon and edges are not replaced that would cause the point 810 to be located outside the polygon (as discussed with respect to FIG. 8A).

In some examples, boundary edges are replaced in a serial manner to ensure that a simple polygon is maintained after each boundary edge replacement. In particular examples, the systems and methods described herein may be used with convex hulls representing static objects or dynamic objects.

Figure 9:
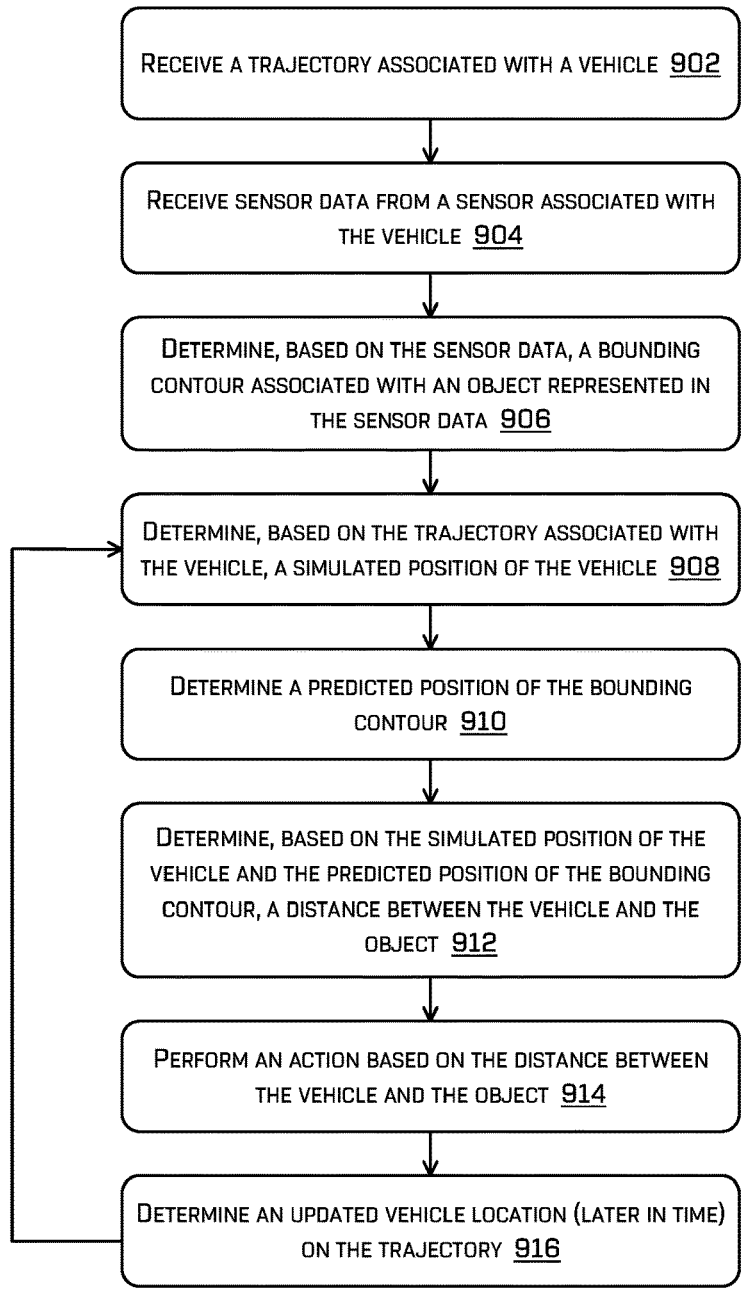
FIG. 9 is an illustration of an example process for determining a distance between a vehicle and an object based on the object's bounding contour, in accordance with examples of the disclosure.

FIG. 9 is an illustration of an example process 900 for determining a distance between a vehicle and an object based on the object's bounding contour, in accordance with examples of the disclosure. The operations described herein with respect to the process 900 may be performed by one or more vehicle computing devices, as discussed herein.

By way of example, the process 900 is illustrated as a logical flow graph, each operation of which represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the process 900. In some examples, multiple branches represent alternate implementations that may be used separately or in combination with other operations discussed herein.

At operation 902, the process may include receiving a trajectory associated with a vehicle. The trajectory may be a planned path for the vehicle to follow toward a destination. At operation 904, the process may receive sensor data from a sensor associated with the vehicle. In some examples, the sensor may be a lidar sensor and the sensor data may be lidar data, which can include a lidar point cloud.

At operation 906, the process may determine a bounding contour associated with an object represented in the sensor data. In some examples, the bounding contour may be determined based on a lidar point cloud associated with the object.

At operation 908, the process may determine a simulated position of the vehicle based on the trajectory associated with the vehicle. In some examples, the position of the vehicle may be simulated at different points along the trajectory to determine a likelihood of collision with an obstacle at those different points. By identifying potential collisions along the trajectory at a future time, the vehicle may have extra time to take one or more actions that reduce or eliminate the likelihood of the collision. In some examples, the collisions can be detected laterally from a pose that a vehicle may occupancy at a future time. For example, multiple poses can be predicted that the vehicle may occupy depending on its current trajectory. Along each of these poses, a lateral collision detection technique can be applied according to the disclosed techniques. Similar techniques can be applied for multiple projected trajectories/poses to account for predicted possible future poses of the vehicle along multiple paths and/or in response to different future decision possibilities.

At operation 910, the process may determine a predicted position of the bounding contour. In some examples, the simulated position of the vehicle at different points (e.g., future times) along the trajectory may be compared to predicted positions of the bounding contour at the same future time. In some examples, the operation 910 can include receiving a predicted trajectory of the object associate with the bounding contour, and in some examples, the predicted position can be based on the predicted trajectory. In some examples, the operation 910 can include determining a predicted orientation for the bounding contour along the predicted trajectory.

At operation 912, the process may determine a distance between the vehicle and the object at the future time. In some examples, the distance may be determined based on the simulated position of the vehicle and the predicted position of the bounding contour, which represents the object. The distance between the vehicle and the bounding contour may be helpful in determining a likelihood of collision between the vehicle and the object.

At operation 914, the process may perform an action based on the distance between the vehicle and the object. In some examples, an action may be triggered if the distance between the vehicle and the object is less than a threshold value. In some examples, the threshold can be based on a speed of the vehicle and/or the object, a classification of the object, map data associated with the environment, a behavior of the object, and the like. As discussed herein, the action may include a driving maneuver that reduces or eliminates the likelihood of a collision between the vehicle and the object.

At operation 916, the process may determine an updated vehicle location (at a later time) on the trajectory. In some examples, the process may return to operation 908 to determine a simulated vehicle position based on the later time and determine a likelihood of a collision at that later time.

Figure 10B:
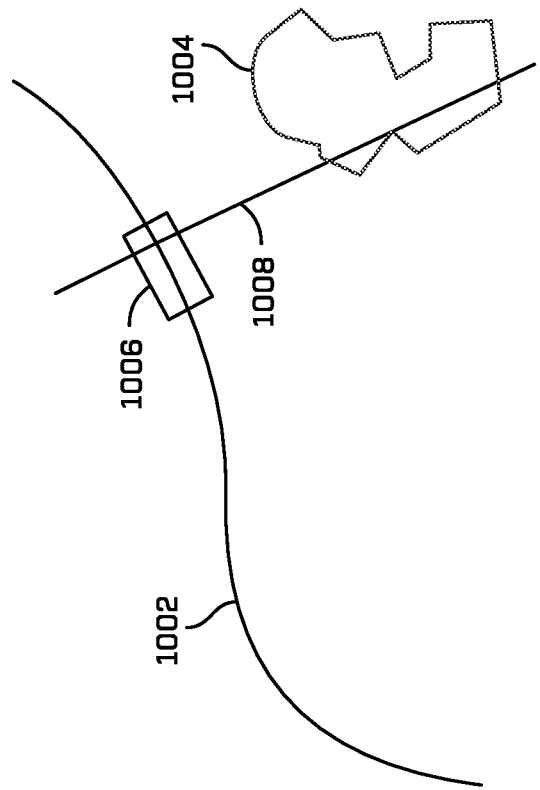
FIGS. 10A and 10B illustrate an example vehicle trajectory and bounding contour of an object when determining a distance between the vehicle and the bounding contour, in accordance with examples of the disclosure.
Figure 10A:
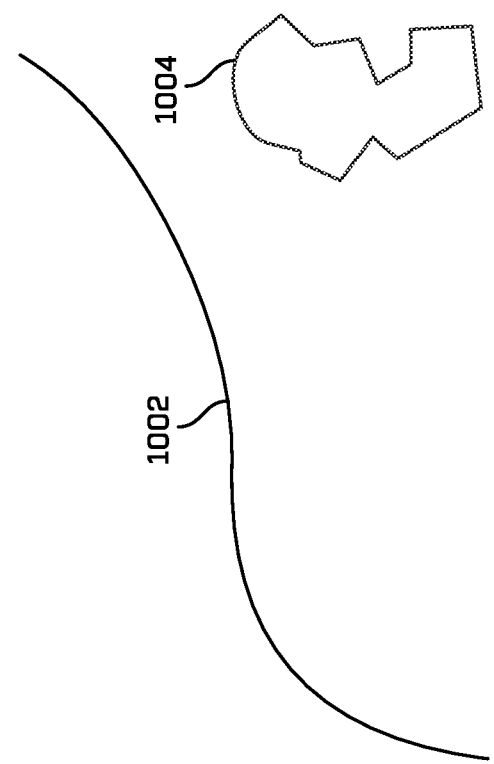

FIGS. 10A and 10B illustrate an example vehicle trajectory 1002 and a bounding contour 1004 of an object when determining a distance between a vehicle and the bounding contour 1004, in accordance with examples of the disclosure. In some examples, the vehicle trajectory 1002 identifies a planned navigation path for a vehicle through an environment. As shown in FIGS. 10A and 10B, the bounding contour 1004 is located proximate the vehicle trajectory 1002. As discussed herein, the bounding contour 1004 may be associated with any type of object, such as vehicles, pedestrians, animals, buildings, street signs, trees, and the like.

FIG. 10B illustrates a specific time when a vehicle 1006 is located at a particular location on the vehicle trajectory 1002. In the example of FIG. 10B, it may be desirable to determine a distance between the vehicle 1006 and the object defined by the bounding contour 1004. This distance may be important to determine whether the vehicle 1006 can safely navigate past the bounding contour 1004 when following the vehicle trajectory 1002. In some embodiments the distance between the vehicle 1006 and the object defined by the bounding contour 1004 may be determined by ray casting as illustrated by a ray trace 1008.

Based on the distance between the vehicle 1006 and the bounding contour 1004, the vehicle 1006 may take one or more actions to avoid collision with an object associated with the bounding contour 1004. For example, the vehicle 1006 may take actions such as steering, braking, sounding a horn, warning vehicle occupants, and the like depending on the distance from the object and the potential risk associated with the type of object. In some examples, certain types of objects, such as fast-moving vehicles, may pose a higher risk of colliding with the vehicle 1006 than a stationary object such as a tree or traffic sign.

In some examples, the vehicle 1006 and the bounding contour 1004 may be propagated along the vehicle's trajectory to determine a future collision between the vehicle 1006 and the object as the vehicle 1006 moves along the vehicle trajectory 1002. In some implementations, the bounding contour 1004 may be determined at multiple points along the vehicle trajectory 1002. The position of vehicle 1006 may be determined at those same points along the vehicle trajectory 1002 using ray casting as discussed herein. These points along the vehicle trajectory 1002 may be particular points in space and time.

In some examples, the systems and methods described herein may determine whether the vehicle 1006 can safely navigate past the object associated with the bounding contour 1004. Even though there may not be a collision, in some examples there may be a minimum threshold of distance (e.g., a safety margin) to ensure safe navigation of the vehicle 1006 past the object.

In some examples, a first boundary can be used to detect a potential collision between a vehicle and an external object. For example, the first boundary can be associated with a bounding box/cube or other relatively simplistic geometric shape. If a potential collision is detected, then a more accurate (and possibly more processor intensive) bounding technique can be used such as the disclosed techniques. The more accurate bounding technique can then be used to verify or disprove the potential collision detected using the bounding box (or other shape).

As shown in FIG. 10B, the ray trace 1008 may extend perpendicularly from the side of the vehicle 1006 and pass through the bounding contour 1004. In some examples, when determining whether a collision may occur between the vehicle 1006 and the object associated with the bounding contour 1004, the systems and methods described herein determine a number of boundaries crossed in the bounding contour 1004 by the ray trace 1008. In particular examples, if the ray trace 1008 crosses an even number of boundaries as it passes through the bounding contour 1004, then there is no collision between the vehicle 1006 and the object. In the example of FIG. 10B, the ray trace 1008 crosses two boundaries of the bounding contour 1004 (e.g., once when the ray enters the bounding contour 1004 and once when the ray exits the bounding contour 1004). Since there are an even number of boundaries, the vehicle 1006 is not likely to collide with the object. This may be confirmed by FIG. 10B, which shows a separation between the vehicle 1006 and the bounding contour 1004. In some examples, if a ray trace 1008 crosses an odd number of boundaries, it means the ray trace 1008 originated within the bounding contour 1004. If the ray trace 1008 originates inside the bounding contour 1004, its an indication of a collision (e.g., at least a portion of the vehicle 1006 and the object share the same space at the same time).

In the example of FIG. 10B, ray trace 1008 is shown as extending perpendicularly from the side of the vehicle 1006. In other examples, ray trace 1008 may extend in any direction from any portion of the vehicle 1006. For example, ray trace 1008 may extend longitudinally from the front or back of the vehicle 1006 to determine a distance between the vehicle 1006 and an object in front of the vehicle 1006 or behind the vehicle 1006.

Figure 11A:
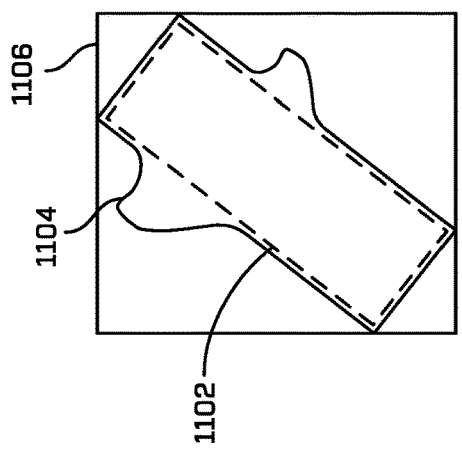
FIGS. 11A-11C illustrate example bounding boxes, bounding contours, and axis-aligned bounding boxes, in accordance with examples of the disclosure.
Figure 11B:
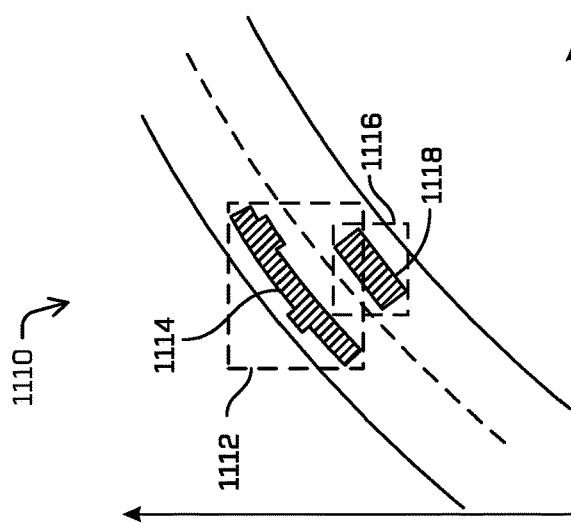
Figure 11C:
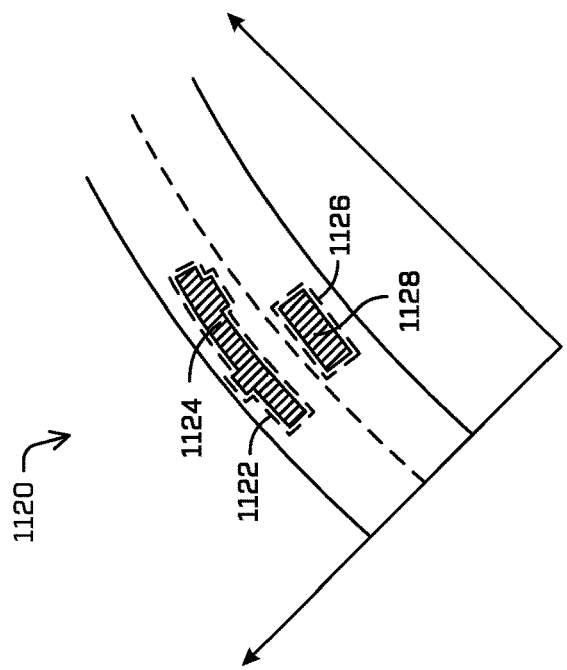

FIGS. 11A-11C illustrate example bounding boxes, bounding contours, and axis-aligned bounding boxes, in accordance with examples of the disclosure. In the example of FIG. 11A, three representations of an object are illustrated: a bounding box 1102, a bounding contour 1104, and an axis-aligned bounding box (AABB) 1106. The example object represented in FIG. 11A may be a vehicle. In some examples, the bounding box 1102 is a rectangle that represents a significant portion of the object (i.e., the vehicle). As shown in FIG. 11A, the long sides of the bounding box 1102 may represent the sides of the vehicle. However, long sides of the bounding box 1102 may not include side mirrors extending from each side of a vehicle. Thus, the bounding box 1102 may not accurately represent all portions of the vehicle or other object.

In the example of FIG. 11A, the bounding contour 1104 may provide a more accurate representation of the vehicle. For example, the bounding contour 1104 identifies the vehicle's two side mirrors, which may be important to consider when determining a likelihood of collision between the vehicle and another object. As noted above, the side mirrors of the vehicle are not represented in the bounding box 1102, which may increase the likelihood of a collision because the systems and methods described herein are not aware of the side mirrors based solely on the bounding box 1102.

FIG. 11A also includes the axis-aligned bounding box (AABB) 1106. The AABB 1106 is a bounding box that may be aligned with a particular axis, such as an x-y axis, a longitudinal axis of a vehicle or other object, and the like. In the example of FIG. 11A, AABB 1106 is aligned on an x-y axis. In some examples, the AABB 1106 is used to perform a quick check regarding the likelihood of a collision between the vehicle represented by AABB 1106 and another object. For example, a quick check using the AABB 1106 may use a dynamic AABB tree for dynamic contours. The dynamic AABB tree may allow an efficient lookup of contours having AABBs that overlap with the AABB of a query contour (e.g., a contour of a vehicle checking for possible collisions with other objects).

In the example of FIG. 11B, an environment 1110 includes a first vehicle (or object) 1114 and a second vehicle (or object) 1118. In this example, the first vehicle 1114 has an associated AABB 1112 and the second vehicle 1118 has an associated AABB 1116. As shown in FIG. 11B, the AABB 1112 and the AABB 1116 are aligned with a local Universal Transverse Mercator (UTM). Thus, the AABB 1112 and the AABB 1116 are aligned with the horizontal and vertical axes illustrated in FIG. 11B. In the example of FIG. 11B, the AABB 1112 and the AABB 1116 overlap with one another, which may cause a collision avoidance system or algorithm to detect a potential collision between the first vehicle 1114 and the second vehicle 1118. However, the example illustrated in FIG. 11B does not represent a collision situation. Instead, there is adequate spacing between the first vehicle 1114 and the second vehicle 1118 in the example of FIG. 11B. The potential collision between the two vehicles 1114 and 1118 may be indicated due to the areas of the AABB 1112 and the AABB 1116 that do not accurately represent the first vehicle 1114 and the second vehicle 1118, respectively.

In the example of FIG. 11C, an environment 1120 includes a first vehicle (or object) 1124 and a second vehicle (or object) 1128. In this example, the first vehicle 1124 has an associated AABB 1122 and the second vehicle 1128 has an associated AABB 1126. As shown in FIG. 11C, the AABB 1122 and the AABB 1126 are aligned with the yaw of vehicles 1124 and 1128. This alignment with the yaw of vehicles 1124 and 1128 avoids the overlap of the AABBs 1122 and 1126. By aligning the AABBs 1122 and 1126 with the yaw of the vehicles, the AABBs 1122 and 1126 provide a more accurate representation of the vehicle contours. These "tighter" AABBs 1122 and 1126 do not overlap, which is a more accurate representation of the environment 1120. In the example of FIG. 11C, a collision avoidance system or algorithm may not detect a potential collision between the first vehicle 1124 and the second vehicle 1128.

In some examples, a planning and/or prediction component of a vehicle may use one or more bounding boxes, bounding contours, and AABBs to determine a vehicle trajectory, navigate the vehicle along the vehicle trajectory, predict potential collisions between the vehicle and other objects, initiate actions (e.g., vehicle actions) based on potential collisions, and the like. In one or more examples, the systems and methods described herein may initially perform a coarse analysis to predict collisions or determine whether an object will maintain a threshold distance from the vehicle. This threshold distance may also be referred to as a safety radius associated with the vehicle. This coarse analysis may be performed, for example, using an AABB or a bounding box. This coarse analysis can be performed quickly with minimal computing resources. If the coarse analysis identifies a potential collision, or the vehicle and object fail to maintain a threshold distance from each other, the described systems and methods may perform a more detailed analysis using, for example, boundary contours and ray tracing. In some examples, vehicle planning may be performed from both the front vehicle axle and the rear vehicle axle.

In some examples, collision checking may be limited in time or distance. For example, collision checking may be limited in time to the next few seconds. In a dynamic environment, collision checking far into the future may be inaccurate due to multiple dynamic objects moving in the environment. Thus, to conserve computing resources and generate accurate data, collision checking may be limited to several seconds into the future.

Additionally, collision checking may be limited to a specific distance from the vehicle. For example, a vehicle moving along a trajectory may be concerned with objects that are within a particular distance of the vehicle or the vehicle's trajectory. In some implementations, objects that are far from the vehicle and the vehicle's trajectory can be ignored until they move within a threshold distance for analysis. Ignoring these objects conserves computing resources and focuses those computing resources on objects that are a high priority based on their proximity to the vehicle or the vehicle trajectory.

In some examples, the systems and methods described herein may check for collisions between a vehicle trajectory and bounding contours associated with objects. In one or more examples, an AABB tree can be created and all bounding contours are aligned with the vehicle's yaw (as shown in FIG. 11C). The vehicle trajectories may be added to the AABB tree. In some examples, the AABB tree can be queried for candidates for collision. In some examples, the described systems and methods may query the AABB tree based on particular time periods.

In some examples, the AABB tree or other techniques can be used to determine a potential collision using an AABB or other relative course representation. In response to detecting a potential collision using a bounding box, a more accurate representation can be determined via a bounding contour, as disclosed herein. For example, a course representation may indicate a first probability of a potential collision in a certain scenario. In response to the first probability meeting a threshold, a second determination of a potential collision can be made using a more accurate representation. The second determination can include determining a second probability of a potential collision in the same scenario wherein the second probability can be different than the first probability. The second probability, for example, may indicate a lower likelihood of a collision than the first probability. The use of the more accurate representation may be more complex than the use of the coarser representation. Using the two-step approach described can result in less overall complexity for a system to determine potential collisions.

In some examples, if a collision is detected, the described systems and methods may invalidate the vehicle's current trajectory or change the accuracy of the trajectory based on the time and distance of the collision from the vehicle. Similarly, if a safety margin is compromised, the systems and methods may invalidate or change the vehicle's current trajectory.

Figure 12:
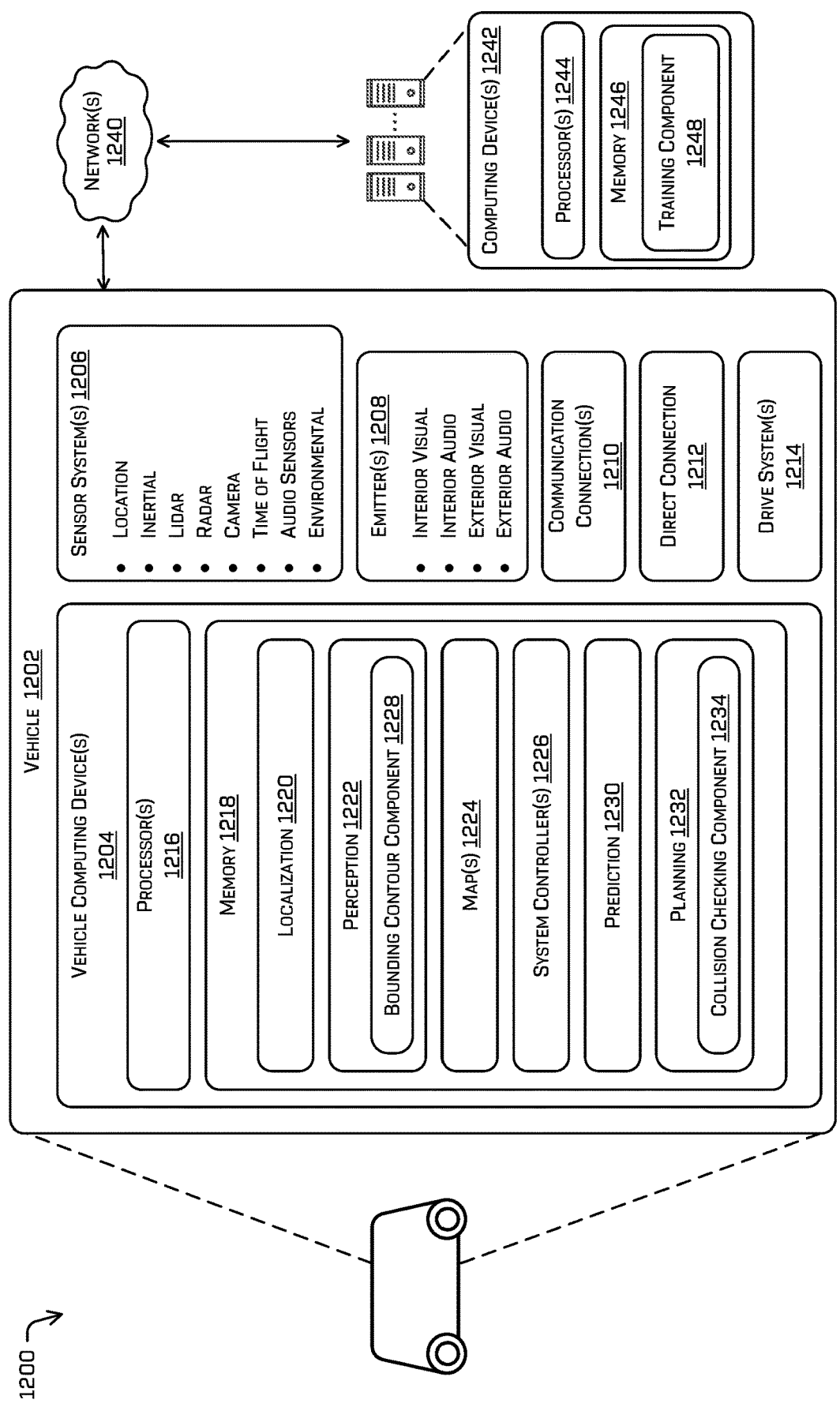
FIG. 12 is an illustration of an example system for implementing the techniques described herein.

FIG. 12 is an illustration of an example system 1200 for implementing the techniques described herein. A vehicle 1202 may include one or more vehicle computing devices 1204, one or more sensor systems 1206, one or more emitters 1208, one or more communication connections 1210, at least one direct connection 1212, and one or more drive systems 1214.

In some examples, the system 1200 can be implemented as a vehicle, such as an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since vehicle can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled.

The vehicle computing device 1204 may include one or more processors 1216 and memory 1218 communicatively coupled with the one or more processors 1216. In the illustrated example, the vehicle 1202 is an autonomous vehicle. However, the vehicle 1202 may be any other type of vehicle. In the illustrated example, the memory 1218 of the vehicle computing device 1204 stores a localization component 1220, a perception component 1222, one or more maps 1224, and one or more system controllers 1226. Though depicted in FIG. 12 as residing in memory 1218 for illustrative purposes, it is contemplated that the localization component 1220, the perception component 1222, the one or more maps 1224, and the one or more system controllers 1226 may additionally, or alternatively, be accessible to the vehicle 1202 (e.g., stored remotely).

In at least one example, the localization component 1220 may include functionality to receive data from the sensor system(s) 1206 to determine a position and/or orientation of the vehicle 1202 (e.g., one or more of an x-, y-, z-position, roll, pitch, or yaw). For example, the localization component 1220 may include and/or request/receive a map of an environment and may continuously determine a location and/or orientation of the autonomous vehicle within the map. In some instances, the localization component 1220 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 1220 may provide data to various components of the vehicle 1202 to determine an initial position of an autonomous vehicle for generating a trajectory and/or for generating or receiving map data, as discussed herein.

In some instances, the perception component 1222 may include functionality to perform object detection, segmentation, and/or classification. In some examples, the perception component 1222 may provide processed sensor data that indicates a presence of an entity that is proximate to the vehicle 1202 and/or a classification of the entity as an entity type (e.g., car, pedestrian, cyclist, animal, building, tree, road surface, curb, sidewalk, unknown, etc.). In additional or alternative examples, the perception component 1222 may provide processed sensor data that indicates one or more characteristics associated with a detected entity (e.g., a tracked object) and/or the environment in which the entity is positioned. In some examples, characteristics associated with an entity may include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

In some examples, perception component 1222 may include a bounding contour component 1228 that may create and manage any number of bounding contours as discussed herein. In particular examples, the bounding contour component 1228 identifies bounding contours associated with one or more objects.

The memory 1218 may further include one or more maps 1224 that may be used by the vehicle 1202 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some instances, the map may be stored in a tiled format, such that individual tiles of the map represent a discrete portion of an environment, and may be loaded into working memory as needed, as discussed herein. In at least one example, the one or more maps 1224 may include at least one map (e.g., images and/or a mesh). In some examples, the vehicle 1202 may be controlled based at least in part on the map(s) 1224. In some examples, the one or more maps 1224 may be stored on a remote computing device(s) (such as the computing device(s) 1242) accessible via network(s) 1240. In some examples, multiple maps 1224 may be stored based on, for example, a characteristic (e.g., type of entity, time of day, day of week, season of the year, etc.). Storing multiple maps 1224 may have similar memory requirements but increase the speed at which data in a map may be accessed.

In at least one example, the vehicle computing device 1204 may include one or more system controllers 1226, which may be configured to control steering, propulsion, braking, safety, emitters, communication, and other systems of the vehicle 1202. These system controller(s) 1226 may communicate with and/or control corresponding systems of the drive system(s) 1214 and/or other components of the vehicle 1202.

In some examples, the memory 1218 may include a prediction component 1230 that predicts various activities and situations proximate the vehicle 1202. In at least one example, prediction component 1230 may predict a likelihood of a collision with an object or other vehicle activity or situation.

In some examples, the memory 1218 may include a planning component 1232 that plans various vehicle activities, plans vehicle trajectories to reach a destination, and the like. In at least one example, planning component 1232 may include a collision checking component 1234 that may identify potential collisions along a vehicle's trajectory. As discussed herein, collision checking component 1234 may use a bounding contour to determine a distance (and likelihood of collision) between the vehicle 1202 and a bounding contour associated with an object near the vehicle's trajectory.

In some instances, aspects of some or all of the components discussed herein may include any models, algorithms, and/or machine learning algorithms. For example, in some instances, the components in the memory 1218 (and the memory 1246, discussed below) may be implemented as a neural network.

As described herein, an exemplary neural network is an algorithm which passes input data through a series of connected layers to produce an output. Each layer in a neural network may also comprise another neural network or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 1206 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), image sensors (e.g., RGB, IR, intensity, depth, etc.), time of flight sensors, audio sensors, wheel encoders, environment sensors (e.g., temperature sensors, humidity sensors, light sensors, pressure sensors, etc.), etc. The sensor system(s) 1206 may include multiple instances of each of these or other types of sensors. For instance, the lidar sensors may include individual lidar sensors located at the corners, front, back, sides, and/or top of the vehicle 1202. As another example, the image sensors may include multiple cameras disposed at various locations about the exterior and/or interior of the vehicle 1202. The sensor system(s) 1206 may provide input to the vehicle computing device 1204. Additionally, or alternatively, the sensor system(s) 1206 may send sensor data, via the one or more networks 1240, to the one or more computing device(s) 1242 at a particular frequency, after a lapse of a predetermined period of time, in near real-time, etc.

The vehicle 1202 may also include one or more emitters 1208 for emitting light and/or sound, as described above. The emitters 1208 in this example include interior audio and visual emitters to communicate with passengers of the vehicle 1202. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 1208 in this example also include exterior emitters. By way of example, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 1202 may also include one or more communication connection(s) 1210 that enable communication between the vehicle 1202 and one or more other local or remote computing device(s). For instance, the communication connection(s) 1210 may facilitate communication with other local computing device(s) on the vehicle 1202 and/or the drive system(s) 1214. Also, the communication connection(s) 1210 may allow the vehicle to communicate with other nearby computing device(s) (e.g., other nearby vehicles, traffic signals, etc.). The communications connection(s) 1210 also enable the vehicle 1202 to communicate with a remote teleoperation computing device or other remote services.

The communications connection(s) 1210 may include physical and/or logical interfaces for connecting the vehicle computing device 1204 to another computing device or a network, such as network(s) 1240. For example, the communications connection(s) 1210 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 1202 may include one or more drive systems 1214. In some examples, the vehicle 1202 may have a single drive system 1214. In at least one example, if the vehicle 1202 has multiple drive systems 1214, individual drive systems 1214 may be positioned on opposite ends of the vehicle 1202 (e.g., the front and the rear, etc.). In at least one example, the drive system(s) 1214 may include one or more sensor systems to detect conditions of the drive system(s) 1214 and/or the surroundings of the vehicle 1202. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 1214. In some cases, the sensor system(s) on the drive system(s) 1214 may overlap or supplement corresponding systems of the vehicle 1202 (e.g., sensor system(s) 1206).

The drive system(s) 1214 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 1214 may include a drive system controller which may receive and preprocess data from the sensor system(s) and to control operation of the various vehicle systems. In some examples, the drive system controller may include one or more processors and memory communicatively coupled with the one or more processors. The memory may store one or more components to perform various functionalities of the drive system(s) 1214. Furthermore, the drive system(s) 1214 also include one or more communication connection(s) that enable communication by the respective drive system with one or more other local or remote computing device(s).

In at least one example, the direct connection 1212 may provide a physical interface to couple the one or more drive system(s) 1214 with the body of the vehicle 1202. For example, the direct connection 1212 may allow the transfer of energy, fluids, air, data, etc. between the drive system(s) 1214 and the vehicle. In some instances, the direct connection 1212 may further releasably secure the drive system(s) 1214 to the body of the vehicle 1202.

In some examples, the vehicle 1202 may send sensor data to one or more computing device(s) 1242 via the network(s) 1240. In some examples, the vehicle 1202 may send raw sensor data to the computing device(s) 1242. In other examples, the vehicle 1202 may send processed sensor data and/or representations of sensor data to the computing device(s) 1242. In some examples, the vehicle 1202 may send sensor data to the computing device(s) 1242 at a particular frequency, after a lapse of a predetermined period of time, in near real-time, etc. In some cases, the vehicle 1202 may send sensor data (raw or processed) to the computing device(s) 1242 as one or more log files.

The computing device(s) 1242 may include processor(s) 1244 and a memory 1246 storing a training component 1248. In some examples, the training component 1248 may include training data that has been generated by a simulator.

The processor(s) 1216 of the vehicle 1202 and the processor(s) 1244 of the computing device(s) 1242 may be any suitable processor capable of executing instructions to process data and perform operations as described herein. By way of example, the processor(s) 1216 and 1244 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 1218 and 1246 are examples of non-transitory computer-readable media. The memory 1218 and 1246 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 1218 and 1246 may include at least a working memory and a storage memory. For example, the working memory may be a high-speed memory of limited capacity (e.g., cache memory) that is used for storing data to be operated on by the processor(s) 1216 and 1244. In some instances, the memory 1218 and 1246 may include a storage memory that may be a lower-speed memory of relatively large capacity that is used for long-term storage of data. In some cases, the processor(s) 1216 and 1244 may not operate directly on data that is stored in the storage memory, and data may need to be loaded into a working memory for performing operations based on the data, as discussed herein.

It should be noted that while FIG. 12 is illustrated as a distributed system, in alternative examples, components of the vehicle 1202 may be associated with the computing device(s) 1242 and/or components of the computing device(s) 1242 may be associated with the vehicle 1202. That is, the vehicle 1202 may perform one or more of the functions associated with the computing device(s) 1242, and vice versa.

EXAMPLE CLAUSES

A. A system comprising: one or more processors; and one or more non-transitory computer-readable media storing instructions executable by the one or more processors, wherein the instructions, when executed, cause the system to perform operations comprising: receiving a trajectory associated with an autonomous vehicle traversing an environment; receiving sensor data from a sensor associated with the autonomous vehicle; determining, based on the sensor data, a bounding contour associated with an object represented in the sensor data; determining, based on a location of the autonomous vehicle along the trajectory, a predicted position and orientation of the bounding contour; determining, based on ray casting, a distance between the location and the bounding contour at the predicted position and orientation; and controlling the autonomous vehicle based on the distance.

B. The system of paragraph A, wherein the bounding contour is a polygon representing a convex hull associated with the object.

C. The system of paragraph B, the operations further comprising: connecting at least two points of the sensor data, wherein the polygon is determined based on the connecting the at least two points.

D. The system of any of paragraphs A-C, wherein the distance is a first distance, and wherein the operations further comprise determining a second distance based on an axis-aligned bounding box corresponding to the object.

E. The system of any of paragraphs A-D, the operations further comprising: comparing the distance to a threshold, wherein the threshold is based on a velocity of the autonomous vehicle and an object type associated with the object.

F. A method comprising: receiving a trajectory associated with a vehicle; receiving sensor data from a sensor associated with the vehicle; determining a bounding contour associated with an object represented in the sensor data; determining, based on the trajectory, a predicted position of the vehicle; determining a predicted position of the bounding contour associated with the object; determining, based on the simulated position of the vehicle and the predicted position of the bounding contour, a distance between the vehicle and the object; and performing an action based on the distance between the vehicle and the object.

G. The method of paragraph F, wherein the bounding contour is a polygon representing a convex hull associated with the object determined by connection of at least two points of the sensor data.

H. The method of paragraph F or G, wherein the action includes validating the trajectory or invalidating the trajectory.

I. The method of any of paragraphs F-H, wherein determining the distance between the vehicle and the object is based at least in part on ray casting.

J. The method of any of paragraphs F-I, further comprising determining a predicted orientation of the bounding contour.

K: The method of paragraph J, wherein the predicted orientation is based at least in part on a predicted trajectory associated with the object.

L. The method of any of paragraphs F-K, wherein the sensor is a lidar sensor and the sensor data comprises lidar data.

M. The method of any of paragraphs F-L, further comprising representing the bounding contour as a representation of a plurality of connected points.

N. The method of any of paragraphs F-M, wherein the distance is a first distance, the method further comprising determining a second distance based on an axis-aligned bounding box.

O. The method of any of paragraphs F-N, further comprising: comparing the distance to a threshold, wherein the threshold is based on at least one of a velocity of the vehicle or an object type associated with the object.

P. The method of any of paragraphs F-O, further comprising: determining, based at least in part on an orientation of the vehicle, an axis-aligned bounding box associated with the bounding contour.

Q. The method of any of paragraphs F-P, wherein the bounding contour associated with the object includes at least five boundary edges.

R. One or more non-transitory computer-readable media storing instructions that, when executed, cause one or more processors to perform operations comprising: receiving a trajectory associated with a vehicle; receiving sensor data from a sensor associated with the vehicle; determining a bounding contour associated with an object represented in the sensor data; determining, based on the trajectory, a simulated position of the vehicle; determining a predicted position of the bounding contour associated with the object; determining, based on the simulated position of the vehicle and the predicted position of the bounding contour, a distance between the vehicle and the object; and performing an action based on the distance between the vehicle and the object.

S. The one or more non-transitory computer-readable media of paragraph R, wherein the bounding contour is a polygon representing a convex hull associated with the object determined by connection of at least two points of the sensor data.

T. The one or more non-transitory computer-readable media of paragraph R or S, wherein the operations further comprise: determining an axis-aligned bounding box associated with the bounding contour; and determining a second distance between the vehicle and the object based on the axis-aligned bounding box.

U. A system comprising: one or more processors; and one or more non-transitory computer-readable media storing instructions executable by the one or more processors, wherein the instructions, when executed, cause the system to perform operations comprising: receiving lidar data associated with an object; projecting, as projected lidar data, the lidar data onto a two-dimensional plane; determining a first convex hull based on the projected lidar data, wherein the first convex hull comprises a plurality of boundary edges; determining a longest boundary edge, wherein the longest boundary edge has a first endpoint and a second endpoint; determining an interior point in the interior of the first convex hull; replacing the longest boundary edge with a first segment based on the first endpoint and the interior point, and a second segment based on the interior point and the second endpoint; and determining an updated convex hull based on the first segment and the second segment.

V. The system of paragraph U, wherein the updated convex hull represents a bounding contour associated with the object, the operations further comprising: determining an action based on the bounding contour associated with the object, wherein the action includes at least one of controlling a vehicle, determining a static object, determining a dynamic object, or updating map data.

W. The system of paragraph U or V, wherein determining the longest boundary edge comprises: identifying a plurality of boundary edges associated with the first convex hull; and determining the longest boundary edge from among the plurality of boundary edges associated with the first convex hull.

X. The system of any of paragraphs U-W, further comprising: identifying a bounding box associated with an object identified in the lidar data; expanding, as an expanded bounding box, a size of the bounding box; and capturing additional lidar data within the expanded bounding box.

Y. A method comprising: receiving sensor data associated with an object; determining a first convex hull based on the sensor data, wherein the first convex hull comprises a plurality of boundary edges; determining a longest boundary edge, wherein the longest boundary edge has a first endpoint and a second endpoint; determining an interior point in an interior of the first convex hull; replacing the longest boundary edge with: a first segment based on the first endpoint and the interior point; and a second segment based on the interior point and the second endpoint; and determining a second convex hull based on the first segment and the second segment.

Z. The method of paragraph Y, wherein the sensor data associated with the object includes a plurality of lidar points, the method further comprising: projecting a plurality of lidar points onto a two-dimensional plane; and repositioning a point of the plurality of lidar points to a closest location on a predefined grid.

AA. The method of paragraph Y or Z, further comprising: determining a second interior point in the interior of the first convex hull; determining a third segment based on the first endpoint and the second interior point; and determining a fourth segment based on the second interior point and the second endpoint.

AB. The method of paragraph AA, further comprising: determining a first angle associated with the first segment and the second segment; determining a second angle associated with the third segment and the fourth segment; and determining the largest angle among the first angle and the second angle, wherein replacing the longest boundary edge further includes at least one of: replacing the longest boundary edge with the first segment and the second segment responsive to determining that the first angle is larger than the second angle; or replacing the longest boundary edge with the third segment and the fourth segment responsive to determining that the second angle is larger than the first angle.

AC. The method of any of paragraphs Y-AB, further comprising: determining, based on the second convex hull, a three-dimensional object.

AD. The method of any of paragraphs Y-AC, wherein the second convex hull represents a bounding contour associated with the object, the method further comprising: determining, based on the bounding contour associated with the object, a probability associated with a potential collision between the vehicle and the object.

AE. The method of any of paragraphs Y-AD, wherein the second convex hull represents a bounding contour associated with the object, the method further comprising: determining an action based on the bounding contour associated with the object, wherein the action includes at least one of controlling a vehicle, determining a static object, determining a dynamic object, or updating map data.

AF. The method of any of paragraphs Y-AE, further comprising: identifying a bounding box associated with an object identified in the sensor data; expanding, as an expanded bounding box, a size of the bounding box; and capturing all sensor data points within the expanded bounding box.

AG. The method of any of paragraphs Y-AF, further comprising: determining a next longest boundary edge; determining that a length of the next longest boundary edge is less than a threshold length; and outputting the second convex hull based at least in part on the length being less than a threshold length.

AH. The method of paragraph AG, further comprising: determining the threshold length based at least in part on the largest boundary edge.

AI: The method of any of paragraphs Y-AH, further comprising: outputting the second convex hull based at least in part on: a number of edges of the convex hull meeting or exceeding a first threshold; a length of a longest remaining boundary edge being less than a second threshold; or a number of interior points associated with the second convex hull being less than a third threshold.

AJ. The method of any of paragraphs Y-AI, further comprising determining a plurality of lidar points based on instance segmentation.

AK. The method of any of paragraphs Y-AJ, wherein the first convex hull includes at least five boundary edges.

AL. One or more non-transitory computer-readable media storing instructions that, when executed, cause one or more processors to perform operations comprising: receiving sensor data associated with an object; determining a first convex hull based on the sensor data, wherein the first convex hull comprises a plurality of boundary edges; determining a longest boundary edge, wherein the longest boundary edge has a first endpoint and a second endpoint; determining an interior point in an interior of the first convex hull; replacing the longest boundary edge with: a first segment based on the first endpoint and the interior point; and a second segment based on the interior point and the second endpoint; and determining a second convex hull based on the first segment and the second segment.

AM. The one or more non-transitory computer-readable media of paragraph AL, wherein the sensor data associated with the object includes a plurality of lidar points, the operations further comprising: projecting a plurality of lidar points onto a two-dimensional plane; and repositioning a point of the plurality of lidar points to a closest location on a predefined grid.

AN. The one or more non-transitory computer-readable media of paragraph AL or AM, wherein the operations further comprise: identifying a bounding box associated with an object identified in the sensor data; expanding, as an expanded bounding box, a size of the bounding box; and capturing all sensor data points within the expanded bounding box.

While the example clauses described above are described with respect to one particular implementation, it should be understood that, in the context of this document, the content of the example clauses can also be implemented via a method, device, system, computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein. In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein described need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
receiving lidar data associated with an object;
identifying a bounding box associated with an object identified in the lidar data;
expanding, as an expanded bounding box, a size of the bounding box;
capturing additional lidar data within the expanded bounding box;
projecting, as projected lidar data, the lidar data and the additional lidar data onto a two-dimensional plane;
determining a first convex hull based on a subset of the projected lidar data, wherein the first convex hull comprises a plurality of boundary edges;
determining a longest boundary edge, wherein the longest boundary edge has a first endpoint and a second endpoint;
determining an interior point in an interior of the first convex hull;
replacing the longest boundary edge with a first segment based on the first endpoint and the interior point, and a second segment based on the interior point and the second endpoint; and
determining an updated convex hull based on the first segment and the second segment.

2. The system of claim 1, wherein the updated convex hull represents a bounding contour associated with the object, the operations further comprising:
determining an action based on the bounding contour associated with the object, wherein the action includes controlling a vehicle, determining a static object, determining a dynamic object, or updating map data.

3. The system of claim 1, wherein determining the longest boundary edge comprises:
identifying a plurality of boundary edges associated with the first convex hull; and
determining the longest boundary edge from among the plurality of boundary edges associated with the first convex hull.

4. The system of claim 1, wherein the subset comprises less than all of the lidar data and the additional lidar data.

5. A method comprising:
receiving sensor data associated with an object;
identifying a bounding box associated with an object identified in the sensor data;
expanding, as an expanded bounding box, a size of the bounding box; and
capturing additional sensor data within the expanded bounding box
determining a convex hull based on a subset of the sensor data and the additional sensor data, wherein the convex hull comprises a plurality of boundary edges;

determining a longest boundary edge, wherein the longest boundary edge has a first endpoint and a second endpoint;

determining an interior point in an interior of the convex hull;

replacing the longest boundary edge with:
- a first segment based on the first endpoint and the interior point; and
- a second segment based on the interior point and the second endpoint; and determining a bounding contour based on the first segment and the second segment.

6. The method of claim 5, wherein the subset comprises less than all of the sensor data and the additional sensor data.

7. The method of claim 5, wherein the sensor data associated with the object includes a plurality of lidar points, the method further comprising:
projecting a plurality of lidar points onto a two-dimensional plane; and
repositioning a point of the plurality of lidar points to a closest location on a predefined grid.

8. The method of claim 5, further comprising:
determining a second interior point in the interior of the convex hull;
determining a third segment based on the first endpoint and the second interior point; and
determining a fourth segment based on the second interior point and the second endpoint.

9. The method of claim 8, further comprising:
determining a first angle associated with the first segment and the second segment;
determining a second angle associated with the third segment and the fourth segment; and
determining the largest angle among the first angle and the second angle, wherein replacing the longest boundary edge further includes at least one of:
replacing the longest boundary edge with the first segment and the second segment responsive to determining that the first angle is larger than the second angle; or
replacing the longest boundary edge with the third segment and the fourth segment responsive to determining that the second angle is larger than the first angle.

10. The method of claim 5, further comprising:
determining, based on the bounding contour, a three-dimensional object.

11. The method of claim 5, further comprising:
determining, based on the bounding contour associated with the object, a probability associated with a potential collision between a vehicle and the object.

12. The method of claim 5, further comprising:
determining an action based on the bounding contour associated with the object, wherein the action includes controlling a vehicle, determining a static object, determining a dynamic object, or updating map data.

13. The method of claim 5, further comprising:
determining a next longest boundary edge;
determining that a length of the next longest boundary edge is less than a threshold length; and
outputting the bounding contour based at least in part on the length being less than a threshold length.

14. The method of claim 13, further comprising:
determining the threshold length based at least in part on the largest boundary edge.

15. The method of claim 5, further comprising:
outputting the bounding contour based at least in part on:
- a number of edges of the convex hull meeting or exceeding a first threshold;
- a length of a longest remaining boundary edge being less than a second threshold; or
- a number of interior points associated with the bounding contour being less than a third threshold.

16. The method of claim 5, further comprising determining a plurality of lidar points based on instance segmentation.

17. The method of claim 5, wherein the convex hull includes at least five boundary edges.

18. One or more non-transitory computer-readable media storing instructions that, when executed, cause one or more processors to perform operations comprising:
receiving sensor data associated with an object;
identifying a bounding box associated with an object identified in the sensor data;
expanding, as an expanded bounding box, a size of the bounding box;
capturing additional sensor data within the expanded bounding box;
determining a convex hull based on a subset of the sensor data and the additional sensor data, wherein the convex hull comprises a plurality of boundary edges;
determining a longest boundary edge, wherein the longest boundary edge has a first endpoint and a second endpoint;
determining an interior point in an interior of the convex hull;
replacing the longest boundary edge with:
- a first segment based on the first endpoint and the interior point; and
- a second segment based on the interior point and the second endpoint; and determining a bounding contour based on the first segment and the second segment.

19. The one or more non-transitory computer-readable media of claim 18, wherein the sensor data associated with the object includes a plurality of lidar points, the operations further comprising:
projecting a plurality of lidar points onto a two-dimensional plane; and
repositioning a point of the plurality of lidar points to a closest location on a predefined grid.

20. The one or more non-transitory computer-readable media of claim 18, wherein determining the bounding contour determining comprises determining a plurality of triangles based on less than all of the sensor data and the additional sensor data.

* * * * *